(12) United States Patent
Saitoh et al.

(10) Patent No.: US 7,206,275 B2
(45) Date of Patent: Apr. 17, 2007

(54) OPTICAL PICKUP DEVICE

(75) Inventors: Ryo Saitoh, Yokohama (JP); Makoto Itonaga, Yokohama (JP)

(73) Assignee: Victor Company of Japan, Limited, Yokohama, Kanagawa-Ken (JP)

( * ) Notice: Subject to any disclaimer, the term of this patent is extended or adjusted under 35 U.S.C. 154(b) by 448 days.

(21) Appl. No.: 10/921,864

(22) Filed: Aug. 20, 2004

(65) Prior Publication Data

US 2005/0047313 A1 Mar. 3, 2005

(30) Foreign Application Priority Data

Aug. 22, 2003 (JP) .............................. P2003-299176

(51) Int. Cl.
G11B 7/00 (2006.01)
(52) U.S. Cl. ...................... 369/112.05; 369/112.07; 369/112.22; 369/112.23; 369/94
(58) Field of Classification Search .................... None
See application file for complete search history.

(56) References Cited

U.S. PATENT DOCUMENTS

| | | | |
|---|---|---|---|
| 6,069,863 A * | 5/2000 | Shimizu et al. | 369/44.23 |
| 6,449,095 B1 * | 9/2002 | Ohtaki et al. | 369/103 |
| 6,552,990 B1 * | 4/2003 | Kajiyama et al. | 369/94 |
| 6,856,587 B2 * | 2/2005 | Kim et al. | 369/112.1 |
| 6,870,805 B1 * | 3/2005 | Arai et al. | 369/112.07 |
| 6,950,384 B2 * | 9/2005 | Arai et al. | 369/44.23 |
| 6,952,390 B2 * | 10/2005 | Mimori | 369/112.07 |
| 7,075,865 B2 * | 7/2006 | Nishioka et al. | 369/44.37 |
| 7,120,109 B1 * | 10/2006 | Kim et al. | 369/112.24 |
| 2002/0181366 A1 * | 12/2002 | Katayama | 369/112.17 |
| 2004/0032815 A1 * | 2/2004 | Kim et al. | 369/112.24 |

FOREIGN PATENT DOCUMENTS

JP 2003-067972 3/2003

OTHER PUBLICATIONS

Katayama, R., "Blue/DVD/CD Compatible Optical Head", Microoptics News, vol. 20, No. 3, pp. 19-23.

* cited by examiner

*Primary Examiner*—Thang V. Tran
(74) *Attorney, Agent, or Firm*—The Nath Law Group; Jerald L. Meyer; Derek Richmond

(57) ABSTRACT

An aberration correction element is disposed between first to third laser light sources and an objective lens, first and second laser lights emitted from the first and second laser light sources are incident upon the aberration correction element in the form of parallel lights, and a third laser light emitted from the third laser light source is incident upon the aberration correction element in the form of a divergent light.

4 Claims, 14 Drawing Sheets

FIG.1
PRIOR ART
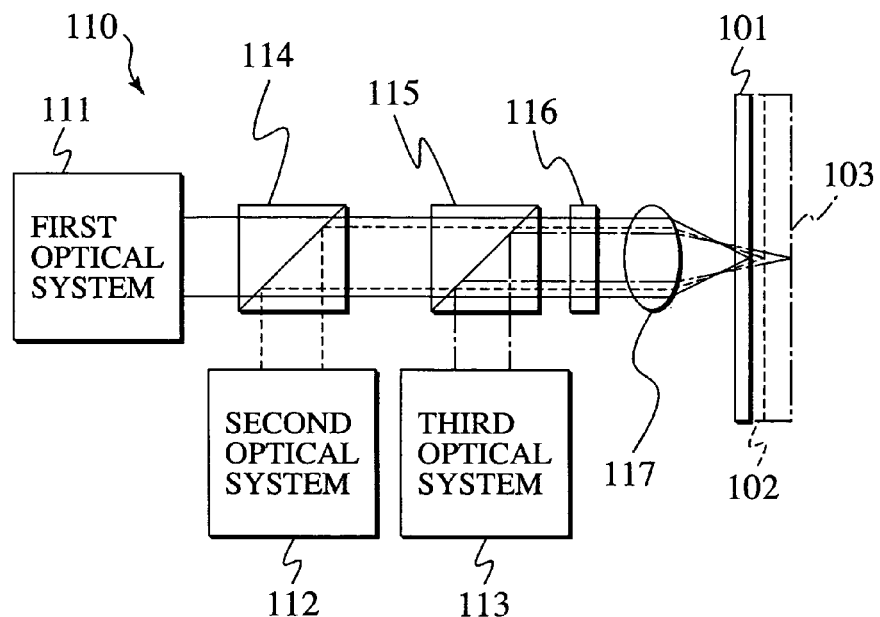
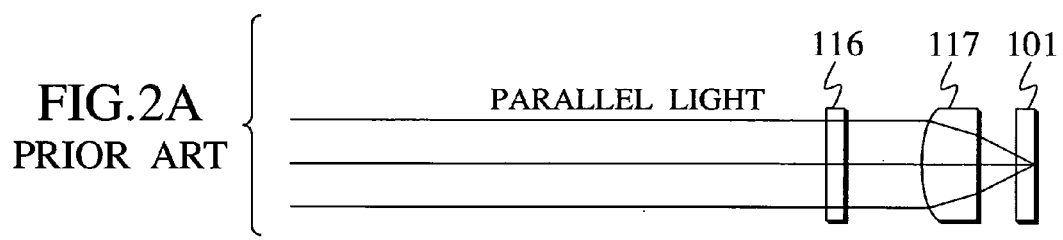
FIG.2A
PRIOR ART
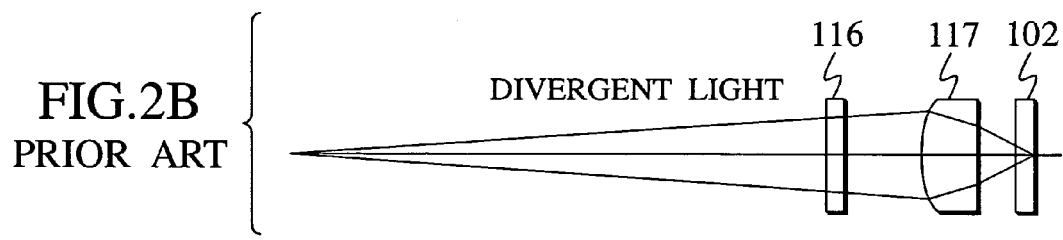
FIG.2B
PRIOR ART
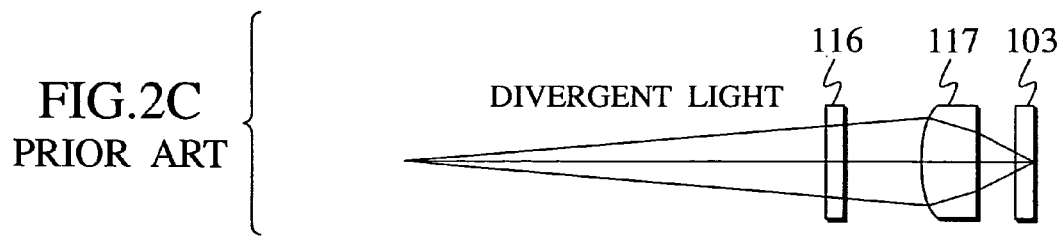
FIG.2C
PRIOR ART

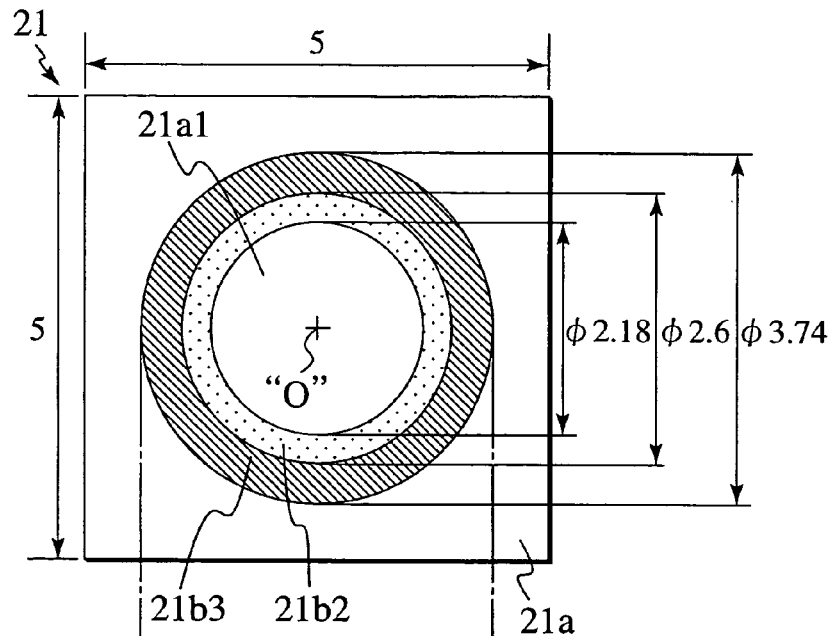
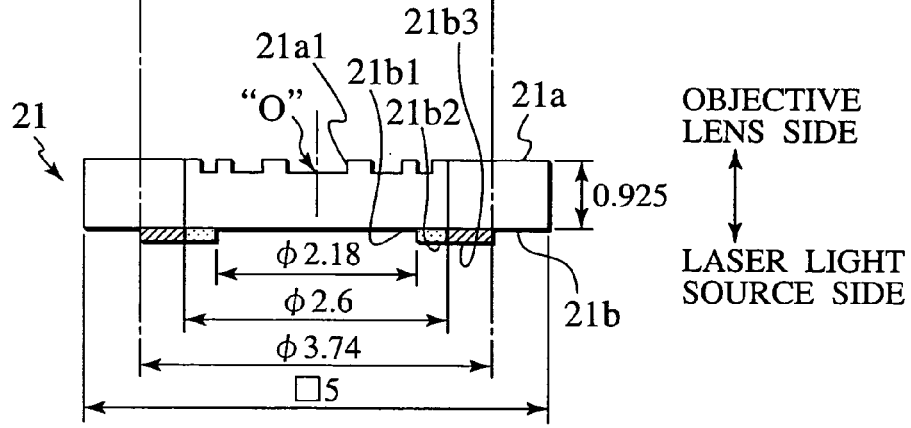
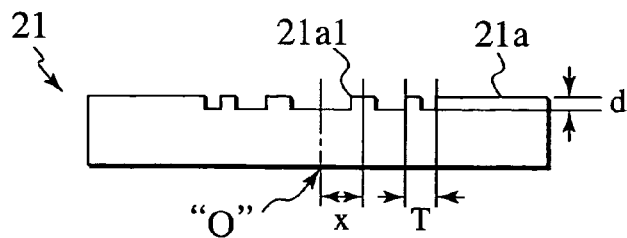

OPTICAL PICKUP DEVICE

BACKGROUND OF THE INVENTION

1. Field of the Invention

The present invention relates to an optical pickup device comprising an objective lens having a numerical aperture (NA) of 0.75 or more, and an aberration correction element for correcting a spherical aberration generated by a difference of a substrate thickness among first to third optical recording mediums at a time when the objective lens is used, to selectively record on or reproduce from the first to third optical recording mediums different in substrate thickness using first to third laser lights having different wavelengths.

2. Description of the Background Art

In general, optical recording mediums such as a disc-shaped optical disc and card-shaped optical card have been frequently used, because the mediums are capable of recording information signals such as video information, sound information, and computer data in tracks spirally or concentrically formed on a transparent substrate, and capable of accessing a desired track at a high rate during reproduction of recorded tracks.

As this type of optical recording medium, the optical discs such as a compact disc (CD) and a digital versatile disc (DVD) have already been on the market. In recent years, an extra-high density optical disc (Blu-ray Disc) has been actively developed which is capable of recording or reproducing information signals at a density higher than that of CD, DVD in order to increase the density of the optical disc.

First, for the above-described CD, a disc substrate has heretofore been irradiated with a laser beam obtained by focusing a laser beam having a wavelength of around 780 nm with an objective lens having a numerical aperture (NA) of about 0.45 to record or reproduce the information signal on or from a signal surface which is positioned distant from the laser beam incidence surface of the disc substrate by approximately 1.2 mm.

Moreover, for the above-described DVD, the disc substrate has heretofore been irradiated with the laser beam obtained by focusing a laser beam having a wavelength of around 650 nm with an objective lens having a numerical aperture (NA) of about 0.6 to record or reproduce the information signal on or from the signal surface distant from the laser beam incidence surface of the disc substrate by approximately 0.6 mm. In this case, a recording capacity of the DVD is increased six to eight times that of the CD, and the capacity of one surface is about 4.7 gigabyte (GB) with a diameter of the disc substrate of 12 cm.

Furthermore, the above-described extra-high density optical disc has been developed in which the disc substrate is irradiated with a laser beam having a wavelength of 450 nm or less, which has been focused with an objective lens having a numerical aperture (NA) of 0.75 or more, so as to be capable of recording or reproducing the information signal on or from a signal surface distant from the laser beam incidence surface by approximately 0.05 mm to 0.15 mm. In this case, the recording capacity of the surface of the extra-high density optical disc is around 25 gigabytes (GB) with the diameter of the disc substrate of 12 cm.

Additionally, there has been an optical head device which records or reproduces three types of optical discs having different disc substrate thicknesses (see Japanese Patent Application Laid-Open No. 2003-67972 (page 19, FIG. 8), for example).

FIG. 1 is a diagram showing a configuration of a conventional optical head device. FIGS. 2A to 2C are diagrams schematically showing that three types of optical discs are irradiated with an emission light from three types of optical systems in the conventional optical head device.

A conventional optical head device 110 shown in FIG. 1 is described in the Japanese Patent Application Laid-Open No. 2003-67972 (page 19, FIG. 8) and document "Blue/DVD/CD compatible head., MICROOPTICS NEWS Vol. 20, No. 3, Micro-optics Research Group Journal, 2002.9.6." (pages 20 and 21, FIGS. 2, 7), and here the device will be briefly described with reference to these documents.

As shown in FIG. 1, the conventional optical head device 110 comprises first to third optical systems 111 to 113 for three types of optical discs 101 to 103, first and second interference filters 114, 115, a wavelength selection filter 116, and an objective lens 117.

Each of the three types of first to third optical systems 111 to 113 comprises a semiconductor laser, and a photodetector for receiving a reflected light from the optical disc. In this case, the wavelength of the semiconductor laser in the first optical system 111 is 405 nm, the wavelength of the semiconductor laser in the second optical system 112 is about 650 to 660 nm, and further the wavelength of the semiconductor laser in the third optical system 113 is about 780 to 785 nm.

The first interference filter 114 has a function of transmitting a light having a wavelength of 405 nm, and reflecting a light having a wavelength of 650 to 660 nm. The second interference filter 115 has a function of transmitting a light having a wavelength of 405 nm and a light having a wavelength of 650 to 660 nm, and reflecting a light having a wavelength of 780 to 785 nm.

Moreover, the emitted light from the semiconductor laser in the first optical system 111 is transmitted through the first and second interference filters 114, 115 in order. As shown in FIG. 2A, the light in a state of parallel light is incident upon and subsequently transmitted through the wavelength selection filter 116 as such, incident upon the objective lens 117, and converted onto the optical disc 101 having a disc substrate thickness of 0.1 mm and having next-generation standards. Thereafter, conversely, the reflected light from the optical disc 101 returns and is received by a photodetector in the first optical system 111.

Moreover, the emitted light from the semiconductor laser in the second optical system 112 is reflected by the first interference filter 114 and transmitted through the second interference filter 115. As shown in FIG. 2B, the light in a state of divergent light is incident upon and subsequently diffracted by the wavelength selection filter 116, incident upon the objective lens 117, and converted onto the optical disc 102 having a disc substrate thickness of 0.6 mm and having DVD standards. Thereafter, conversely, the reflected light from the optical disc 102 returns and is received by the photodetector in the second optical system 112.

Furthermore, the emitted light from the semiconductor laser in the third optical system 113 is reflected by the second interference filter 115. As shown in FIG. 2C, the light in a state of divergent light is incident upon and subsequently diffracted by the wavelength selection filter 116, incident upon the objective lens 117, and converted onto the optical disc 103 having a disc substrate thickness of 1.2 mm and having CD standards. Thereafter, conversely, the reflected light from the optical disc 103 returns and is received by the photodetector in the third optical system 113.

According to the conventional optical head device 110 constituted as described above, a spherical aberration generated by the difference of the disc substrate thickness is corrected by the wavelength selection filter 116, so that three types of optical discs 101 to 103 can be recorded or reproduced.

Additionally, in the conventional optical head device 110 described in the Japanese Patent Application Laid-Open No. 2003-67972 and the document "Blue/DVD/CD compatible head, MICROOPTICS NEWS Vol. 20, No. 3, Micro-optics Research Group Journal, 2002.9.6.", the emitted lights from the respective semiconductor lasers in the first to third optical systems 111 to 113 are incident upon the wavelength selection filter 116 and objective lens 117 in order. In this case, as shown in FIGS. 2A to 2C, the emitted light from the semiconductor laser in the first optical system 111 is incident upon the wavelength selection filter 116 in the state of the parallel light, but the respective emitted lights from the semiconductor lasers in the second and third optical systems 112, 113 are incident upon the wavelength selection filter 116 in a state of divergent light. Here, when the divergent light is incident upon the wavelength selection filter 116, and when an optical axis of the divergent light deviates from that of the objective lens 117, the spherical aberration is remarkably deteriorated as compared with the parallel light, and it is difficult to adjust the optical axis at an assembly time as compared with the parallel light.

Moreover, in the document "Blue/DVD/CD compatible head, MICROOPTICS NEWS Vol. 20, No. 3, Micro-optics Research Group Journal, 2002.9.6.", when the first to third optical systems 111 to 113 are assembled, an objective lens shift by the shifts of the optical axes of the respective optical systems 111 to 113 and the objective lens 117 is considered, or a comatic aberration generated by the objective lens shift is corrected. In this case, an RMS wave front aberration ($\gamma$ rms.) with respect to the objective lens shift ($\mu m$) is described as shown in FIG. 3.

FIG. 3 is a diagram showing the wave front aberration at the time of the objective lens shift with respect to the DVD and CD in the conventional optical head device.

In FIG. 3, in general, since an allowable error of ±300 μm from a central axis of the objective lens 117 with respect to the objective lens shift is desired, data is described in this range. However, in either DVD or CD, the wave front aberration is small in a case where there is not any objective lens shift. However, when the objective lens shift is large because of a large absolute value of a magnification (incident conjugated length is short), the wave front aberration rapidly increases. It is to be noted that the incident conjugated length is an interval between the objective lens and a laser light source (additionally, in a case where there is not any optical element between the objective lens and laser light source).

In this case, judging from the figure, when the objective lens shift exceeds approximately ±150 μm, a known Marechal criterion of $0.07\lambda$ rms. is exceeded, and it can be confirmed that the device is not practical.

SUMMARY OF THE INVENTION

To solve the problem, it has been demanded that laser light is incident upon an aberration correction element in a state of parallel light as much as possible in a case where first to third laser lights corresponding to three types of optical recording mediums are incident upon the aberration correction element in an optical pickup device which records or reproduces three types of optical recording mediums such as an extra-high density optical disc (Blu-ray Disc) having next-generation standards, DVD, CD with one objective lens. Moreover, there has been a demand for an optical pickup device which reduces a wave front aberration at a shift time of the objective lens and which is capable of reaching a practical level.

To achieve the above-described object, according to a first aspect of the present invention, there is provided an optical pickup device which selectively records or reproduces data on or from a first optical recording medium, a second optical recording medium having a recording density lower than that of the first optical recording medium, a third optical recording medium having a recording density lower than that of the second optical recording medium, and a combined optical recording medium including appropriately combined and integrally stacked signal surfaces of the first to third optical recording mediums, the device comprising: a first laser light source which emits a first laser light for the first optical recording medium; a second laser light source which emits a second laser light having a wavelength longer than that of the first laser light for the second optical recording medium; a third laser light source which emits a third laser light having a wavelength longer than that of the second laser light for the third optical recording medium; an objective lens whose numerical aperture (NA) is set to 0.75 or more for the first optical recording medium and in which at least one of first and second surfaces turning to a reverse direction each other is formed in a non-spherical surface and which converges the first to third laser lights on the respective signal surfaces of the first to third optical recording mediums; and an aberration correction element in which a circular light-transparent flat portion and annular aperture limiting portions for the third and second laser lights are formed toward an outer circular portion from a central portion in order on an undersurface on the side of the first to third laser light sources and in which a diffraction pattern portion is formed in an inner circular region of an upper surface on the side of the objective lens and in which an outer side of the diffraction pattern portion is formed to be flat, wherein the aberration correction element transmits the first laser light, which is incident thereon in a parallel light state, as such through the light-transparent flat portion and the aperture limiting portions for the second and third laser lights, transmits the first laser light without diffracting the first laser light through the diffraction pattern portion, and allows a 0-order light thereof to be incident upon the objective lens, the aberration correction element interrupts the second laser light, which is incident thereon in the parallel light state, by the aperture limiting portion for the second laser light to limit the numerical aperture into the objective lens to a first predetermined numerical aperture, transmits the second laser light through the light-transparent flat portion and the aperture limiting portion for the third laser light, and thereafter diffracts the second laser light by the diffraction pattern portion so that a 1st order light of the second laser light capable of correcting a spherical aberration with respect to the second laser light that will occur on the objective lens is incident upon the objective lens, and further the aberration correction element interrupts the third laser light, which is incident thereon in a divergent light state, by the aperture limiting portions for the second and third laser lights to limit the numerical aperture into the objective lens to a second predetermined numerical aperture, transmits the third laser light through the light-transparent flat portion, thereafter diffracts the third laser light by the diffraction pattern portion to allow the third laser light to have a larger degree in diffusion that that of the second laser light so that a 1st order light of the third laser light capable of correcting a spherical aberration with respect to the third laser light that will occur on the objective lens is incident upon the objective lens.

According to the optical pickup device of the present invention, especially with respect to the first to third laser lights incident upon the aberration correction element, a laser light flux is preferably incident upon the aberration correction element in the parallel light state rather in the divergent light state if possible. The first laser light for the first optical recording medium and the second laser light for the second optical recording medium are incident upon the aberration correction element in the parallel light state, and only the third laser light for the third optical recording medium is incident upon the aberration correction element in the divergent light state. Therefore, even when optical axes of the first and second laser lights shift slightly from the optical axis of the objective lens, deterioration of the spherical aberration is reduced. Moreover, in the incidence upon the aberration correction element, it is easier to adjust the optical axis of the parallel light than the divergent light at an assembly time. Moreover, the third laser light is incident upon the aberration correction element in the divergent light state. However, since the second laser light is incident upon the aberration correction element in the parallel light state, at this time, the divergent light of the third laser light can be incident upon the aberration correction element while the diverging degree is suppressed as compared with a conventional example. Therefore, the spherical aberration at the objective lens shift time with respect to the second and third optical recording mediums can be enhanced as compared with the conventional example.

Moreover, to achieve the above-described object, according to a second aspect of the present invention, there is provided an optical pickup device which selectively records or reproduces data on or from a first optical recording medium, a second optical recording medium having a recording density lower than that of the first optical recording medium, a third optical recording medium having a recording density lower than that of the second optical recording medium, and a combined optical recording medium including appropriately combined and integrally stacked signal surfaces of the first to third-optical recording mediums, the device comprising: a first laser light source which emits a first laser light for the first optical recording medium; a second laser light source which emits a second laser light having a wavelength longer than that of the first laser light for the second optical recording medium; a third laser light source which emits a third laser light having a wavelength longer than that of the second laser light for the third optical recording medium; an objective lens whose numerical aperture (NA) is set to 0.75 or more for the first optical recording medium and in which at least one of first and second surfaces turning to a reverse direction each other is formed in a non-spherical surface and which converges the first to third laser lights on the respective signal surfaces of the first to third optical recording mediums; and an aberration correction element in which a circular light-transparent flat portion and an annular aperture limiting portion for the third laser light are formed in order toward an outer circular portion from a central portion on an undersurface on the side of the first to third laser light sources and in which a diffraction pattern portion is formed in an inner circular region of an upper surface on the side of the objective lens and in which an outer side of the diffraction pattern portion is formed to be flat, wherein the aberration correction element transmits the first laser light, which is incident thereon in a parallel light state, as such through the light-transparent flat portion and the aperture limiting portion for the third laser light, transmits the first laser light without diffracting the first laser light through the diffraction pattern portion, and allows a 0-order light thereof to be incident upon the objective lens, the aberration correction element transmits the second laser light, which is incident in the parallel light state, as such through the light-transparent flat portion and the aperture limiting portion for the third laser light, and subsequently diffracts the second laser light by the diffraction pattern portion so that a 1st order light of the second laser light capable of correcting a spherical aberration with respect to the second laser light that will occur on the objective lens is incident upon the objective lens, and the aberration correction element interrupts the third laser light, which is incident in a divergent light state, by the aperture limiting portion for the third laser light to limit the numerical aperture into the objective lens to a predetermined numerical aperture, transmits the third laser light through the light-transparent flat portion, subsequently diffracts the third laser light to have a larger degree in diffusion than that of the second laser light by the diffraction pattern portion so that a 1st order light of the third laser light capable of correcting a spherical aberration with respect to the third laser light is incident upon the objective lens.

According to the optical pickup device of the present invention, an effect similar to that of the above-described first aspect of the present invention is obtained. In addition, especially the aperture limiting portion for the third laser light is formed on the undersurface of the aberration correction element on the side of the first to third laser light sources, and the diffraction pattern portion is formed on the upper surface on the side of the objective lens. Therefore, the aberration correction element can be partially simplified, and accordingly the aberration correction element can be prepared inexpensively.

In a preferable embodiment of the present invention, the diffraction pattern portion is formed in a concave/convex state and in an annular form in such a manner that a repetition period of concave/convex portions is gradually shortened or lengthened toward an outer circular portion from an inner circular portion, and a depth of the concave portion in the diffraction pattern portion is set to be between a depth capable of obtaining an approximately maximum diffraction efficiency with respect to the first laser light and a depth capable of obtaining an approximately maximum diffraction efficiency with respect to the second laser light.

According to this embodiment, when the diffraction pattern portion of the aberration correction element is formed in the concave/convex state, the depth of the concave portion in the diffraction pattern portion is set to be between the depth capable of obtaining the approximately maximum diffraction efficiency with respect to the first laser light and the depth capable of obtaining the approximately maximum diffraction efficiency with respect to the second laser light. Therefore, for example, a diffraction efficiency of 77% or more can be obtained with respect to the first laser light having a wavelength $\lambda 1=405$ nm, and a diffraction efficiency of 37% or more can be obtained with respect to both the second laser light having a wavelength $\lambda 2=660$ nm and the third laser light having a wavelength $\lambda 3=780$ nm. Therefore, three types of optical discs can be satisfactorily recorded or reproduced.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a diagram showing a configuration of a conventional optical head device;

FIGS. 2A to 2C are diagrams schematically showing that three types of optical discs are irradiated with emitted lights from three types of optical systems in the conventional optical pickup device;

FIGS. 7A to 7C are explanatory views of the aberration correction element in an embodiment shown in FIG. 4, where FIG. 7A is a top plan view, FIG. 7B is a front view, and FIG. 7C is a concave/convex shape diagram of a concave/convex diffraction pattern portion;

FIG. 14A is a top plan view, FIG. 14B is a front view, and FIG. 14C is a concave/convex shape diagram of the concave/convex diffraction pattern portion;

DESCRIPTION OF THE PREFERRED EMBODIMENTS

An embodiment of an optical pickup device according to the present invention will be described hereinafter in detail with reference to FIGS. 4 to 17.

The optical pickup device according to the present invention is characterized in that there are disposed: an objective lens designed for a first optical recording medium (extra-high density optical disc: Blu-ray Disc) having next-generation optical disc standards; and an aberration correction element for correcting a spherical aberration caused by a difference of a substrate thickness among first to third optical recording mediums at the time of using the objective lens for a case where the first to third optical recording mediums having different substrate thicknesses are selectively recorded or reproduced using first to third laser lights having different wavelengths.

Figure 3:
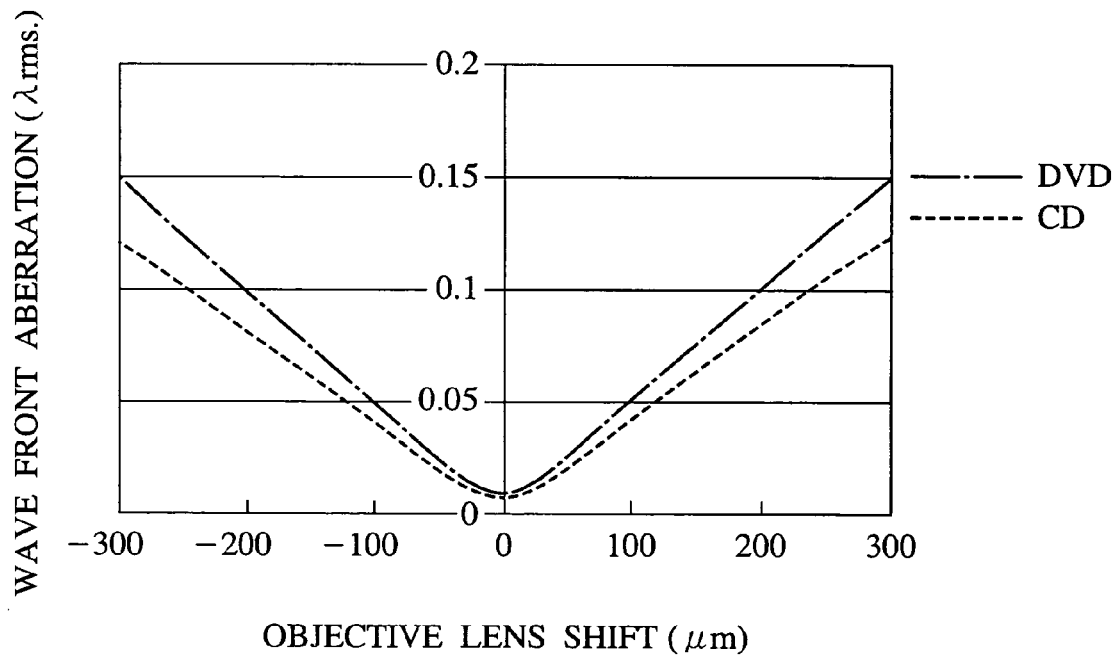
FIG. 3 is a diagram showing a wave front aberration at an objective lens shift time with respect to DVD and CD in the conventional optical pickup device.
Figure 4:
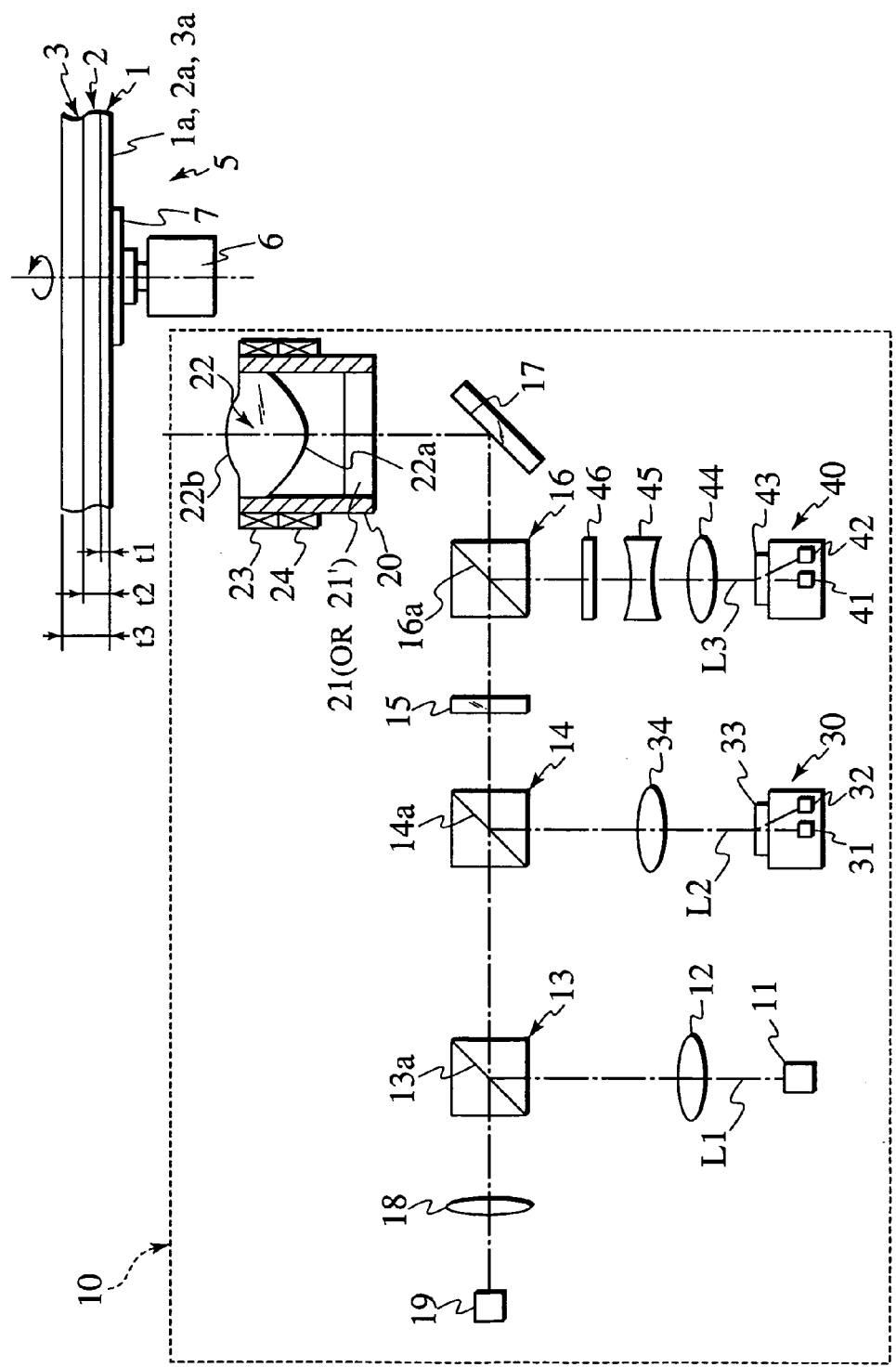
FIG. 4 is a diagram showing the whole constitution of an optical pickup device according to the present invention.

FIG. 4 is a diagram showing the whole constitution of an optical pickup device according to the present invention.

As shown in FIG. 4, an optical pickup device 10 has been developed so as to be capable of selectively applying: a first optical recording medium (hereinafter referred to as the extra-high density optical disc) 1 for recording or reproducing an information signal by a first laser light L1 having a wavelength λ1 of 450 nm or less at an extra-high density; a second optical recording medium (hereinafter referred to as the DVD) 2 for recording or reproducing the information signal at a high density by a second laser light L2 having a wavelength λ2 of around 650 nm, which is longer than the wavelength λ1 of the first laser light L1; a third optical recording medium (hereinafter referred to as the CD) 3 for recording or reproducing the information signal by a wavelength λ3 of around 780 nm, which is longer than the wavelength λ2 of the second laser light L2; and a combined optical recording medium in which any of the first to third laser lights L1 to L3 is incident upon a common laser beam incidence surface and signal surfaces 1b to 3b of the first to third optical recording mediums 1 to 3 are appropriately combined and integrally stacked.

It is to be noted that the combined optical recording medium in which the respective signal surfaces 1b to 3b of the first to third optical recording mediums 1 to 3 are appropriately combined and integrally stacked includes a combination of the signal surface 1b of the first optical recording medium and the signal surface 2b of the second optical recording medium, a combination of the signal surface 1b of the first optical recording medium and the signal surface 3b of the third optical recording medium, and a combination of the signal surface 2b of the second optical recording medium and the signal surface 3b of the third optical recording medium. These combined optical recording mediums are formed in a total disc substrate thickness of approximately 1.2 mm. The individual optical recording mediums will be described below. However, since the combined optical recording medium is an application, the description is omitted.

Moreover, in the following description, an application to a disc-shaped optical disc as the first to third optical recording mediums 1 to 3 will be described, but the present invention is not limited to this, and may also be applied to a card-shaped optical recording medium.

Furthermore, the first to third optical recording mediums 1 to 3 are selectively attached onto a turntable 7 fixed to a shaft of a spindle motor 6 rotatably disposed in an optical disc driving apparatus 5.

Here, in the extra-high density optical disc (Blu-ray Disc) 1 which is the first optical recording medium, a disc substrate thickness t1 between a laser beam incidence surface 1a and the signal surface 1b is set to be thin in a range of approximately 0.05 mm to 0.15 mm based on next-generation optical disc standards. A reinforcing plate is bonded onto the surface so that a total thickness is set to be large, and the total thickness is, for example, approximately 1.2 mm.

Moreover, in the digital versatile disc. (DVD) 2 which is the second optical recording medium, a disc substrate thickness t2 between a laser beam incidence surface 2a and the signal surface 2b is set to approximately 0.6 mm, which is larger than the thickness of the extra-high density optical disc 1, based on DVD standards. An approximately 0.6 mm thick reinforcing plate is bonded onto the surface so that the total thickness is, for example, approximately 1.2 mm.

Furthermore, in the compact disc (CD) 3 which is the third optical recording medium, a disc substrate thickness t3 between a laser beam incidence surface 3a and the signal surface 3b is set to approximately 1.2 mm, which is larger than the thickness of the DVD 2, based on CD standards.

It is to be noted that in this example, the respective disc substrate thicknesses t1, t2, t3 of the extra-high density optical disc 1, DVD 2, and CD 3 are set, for example, to 0.1 mm, 0.6 mm, 1.2 mm, respectively.

Moreover, the optical pickup device 10 according to the present invention is disposed movably in a diametric direction of each optical disc 1, 2, 3 below the laser beam incidence surface 1a of the extra-high density optical disc 1, the laser beam incidence surface 2a of the DVD 2, or the laser beam incidence surface 3a of the CD 3.

In the optical pickup device 10 according to the present invention, a first laser light source (hereinafter referred to as the blue semiconductor laser) 11 for emitting a first laser light L1 having a wavelength $\lambda 1$ of 450 nm or less for the extra-high density optical disc 1, a second laser light source (hereinafter referred to as the red semiconductor laser) 31 in an integrated device for DVD 30 for emitting a second laser light L2 having a wavelength $\lambda 2$ of around 650 nm for the DVD 2, and a third laser light source (hereinafter referred to as the infrared semiconductor laser) 41 in an integrated device for CD 40 for emitting a third laser light L3 having a wavelength $\lambda 3$ of around 780 nm for the CD 3 are disposed.

It is to be noted that the wavelength $\lambda 1$ of the first laser light L1 emitted from the blue semiconductor laser 11 is set, for example, to 405 nm. Also, it is assumed that the wavelength $\lambda 2$ of the second laser light L2 emitted from the red semiconductor laser 31 is set, for example, to 660 nm, and further the wavelength $\lambda 3$ of the third laser light L3 emitted from the infrared semiconductor laser 41 is set, for example, to 780 nm.

First, a blue semiconductor laser 11 side will be described in accordance with the extra-high density optical disc 1. The first laser light L1 having the wavelength $\lambda 1$=405 nm emitted from the blue semiconductor laser 11 is a divergent light of linear polarization (p-polarized light), this divergent light is formed into a parallel light in a collimator lens 12, and the parallel light of the first laser light L1 is reflected by a polarization selective dielectric multilayered film 13a (p-polarization: transmission, s-polarization: reflection) of a polarized beam splitter 13 to change a direction by 90°. Thereafter, the first laser light L1 is transmitted through a dichroic film 14a (wavelength $\lambda 1$: transmission, wavelength $\lambda 2$: reflection) of a first dichroic prism 14, and transmitted through a phase plate 15 to form a circularly polarized light. In this case, the phase plate 15 applies a phase difference of $(\lambda 1)/4$ at a time of transmission of the first laser light L1 having the wavelength $\lambda 1$, and applies a phase difference of $(\lambda 2)/4$ at a time of transmission of the second laser light L2 having the wavelength $\lambda 2$ described later.

Moreover, the first laser light L1 transmitted through the phase plate 15 passes through a dichroic film 16a (wavelength $\lambda 1$: transmission, wavelength $\lambda 2$: transmission, wavelength $\lambda 3$: reflection) of a dichroic prism 16, and changes a ray direction by 90° in a plane mirror 17 for rising. Thereafter, the parallel light of the first laser light L1 is incident upon an aberration correction element 21 stored in a lower part of a lens holder 20, and a 0-order light is transmitted without being diffracted in the aberration correction element 21, and is further incident upon an objective lens 22 stored in an upper part of the lens holder 20. A first laser beam obtained by focusing the first laser light L1 by the objective lens 22 is incident via the laser beam incidence surface 1a of the extra-high density optical disc 1 and converged on the signal surface 1b.

It is to be noted that a function of the aberration correction element 21 with respect to the first laser light L1 will be described later in detail.

In this case, a numerical aperture of the objective lens 22 is set to 0.75 or more for the extra-high density optical disc, and at least one of first and second surfaces 22a, 22b turning to a reverse direction each other is formed in a non-spherical surface. In this embodiment, a single lens having a numerical aperture (NA) of 0.85 is used, and the first surface 22a facing the aberration correction element 21 side and the second surface 22b facing each optical disc 1, 2, 3 side are both formed in the non-spherical surface as described later, and are optimized in an infinitely conjugated state with respect to the first laser light L1 having the wavelength $\lambda 1$=405 nm. Moreover, a distance between the objective lens 22 whose spherical aberration is minimum with respect to the first laser light L1 and the laser beam incidence surface 1a of the extra-high density optical disc 1, that is, a working distance is about 0.5 mm.

Further the aberration correction element 21 stored in the lower part of the lens holder 20 and the objective lens 22 stored in the upper part of the lens holder 20 are integrated in the lens holder 20 while optical axes are aligned with each other, so that the comatic aberration is inhibited from being generated. The aberration correction element 21 and objective lens 22 constituting a main part of the present invention will be described later in detail.

Additionally, a focus coil 23 and a tracking coil 24 are integrally attached to the periphery of the lens holder 20, and the lens holder 20 is supported rockably in the focus direction and tracking direction of the extra-high density optical disc 1, DVD 2, or CD 3 via a plurality of suspension wires (not shown) fixed to the periphery of the lens holder 20.

Moreover, the aberration correction element 21 and objective lens 22 are integrated with the lens holder 20 via the focus coil 23, the tracking coil 24, and a permanent magnet (not shown), and are controlled in the focus direction and tracking direction of the extra-high density optical disc 1. It is to be noted that also in the DVD 2 and CD 3. described later, the aberration correction element 21 and objective lens 22 are integrated with the lens holder 20, and are controlled in the focus direction and tracking direction.

Thereafter, reproducing, recording, or deleting is performed with respect to the signal surface 1b of the extra-high density optical disc 1 by the first laser beam converged on the objective lens 22.

Furthermore, a returning first reflected light by the first laser beam reflected by the signal surface 1b of the extra-high density optical disc 1 forms a circularly polarized light turned in reverse to that of a forward path, and is incident upon the objective lens 22 again. The light is formed into the parallel light by the objective lens 22, transmitted through the aberration correction element 21, thereafter changes the ray direction by 90° by the plane mirror 17, passes through the dichroic film 16a of the second dichroic prism 16 and through the phase plate 15 to form a linearly polarized light (s-polarized light) having a polarization direction crossing that of the forward path at right angles, and passes through the dichroic film 14a of the first dichroic prism 14. In this case, the first reflected light transmitted through the phase plate 15 is the linearly polarized light (s-polarized light) whose polarization direction crosses that of the forward path at right angles. Therefore, the light passes through the polarization selective dielectric multilayered film 13a of the polarized beam splitter 13, forms a convergent light by a cylindrical lens 18, and is converged on a first photodetector 19. Moreover, the first photodetector 19 detects a tracking error signal, focus error signal, and main data signal at a time of reproduction of the signal surface 1b of the extra-high density optical disc 1.

Next, a red semiconductor laser 31 side for the DVD 2 will be described. The second laser light L2 having a wavelength λ2=660 nm emitted from the red semiconductor laser 31 is a divergent light of the linear polarization (p-polarized light), this divergent light passes through a hologram element 33 in the integrated device for DVD 30 to form a parallel light in a collimator lens 34.

It is to be noted that the integrated device for DVD 30 is constituted by integrating the red semiconductor laser 31, a second photodetector 32 disposed on the right side of the red semiconductor laser 31, and the hologram element 33 disposed above the red semiconductor laser 31 and the second photodetector 32 on a semiconductor substrate (not shown).

Moreover, the second laser light L2 transmitted through the collimator lens 34 is reflected by the dichroic film 14a of the dichroic prism 14 to change the ray direction by 90°. The light passes through the phase plate 15 to form the circularly polarized light, and passes through the dichroic film 16a of the second dichroic prism 16. Thereafter, the ray direction is changed by 90° in the plane mirror 17 for rising. Furthermore, for the parallel light of the second laser light L2, an aperture is limited in the outer circular region of the aberration correction element 21 so that the numerical aperture (NA) into the objective lens 22 is 0.6. However, after the spherical aberration is corrected by the 1st order light diffracted in the inner circular region, the divergent light by the diffracted 1st order light is incident upon the objective lens 22, and a second laser beam obtained by focusing the second laser light L2 by the objective lens 22 is incident via the laser beam incidence surface 2a of the DVD 2 and is converted on the signal surface 2b.

It is to be noted that the function of the aberration correction element 21 with respect to the second laser light L2 will be described later in detail.

Thereafter, the reproducing, recording, or deleting is performed with respect to the signal surface 2b of the DVD 2 by the second laser beam converged on the objective lens 22.

Furthermore, a returning second reflected light by the second laser beam reflected on the signal surface 2b of the DVD 2 thereafter forms a circularly polarized light turned in reverse to that of the forward path, and is incident upon the objective lens 22. A second reflected light of the 1st order light is formed into the convergent light flux by the objective lens 22, further formed into the parallel light by the aberration correction element 21, thereafter changes the ray direction by 90° by the plane mirror 17, and is transmitted through the dichroic film 16a of the dichroic prism 16. The light passes through the phase plate 15 to form a linearly polarized light (s-polarized light) reverse to the light of the forward path. The light is reflected by the dichroic film 14a of the first dichroic prism 14 to change the ray direction by 90°, formed in the convergent light by the collimator lens 34, diffracted by the hologram element 33 in the integrated device for DVD 30, and converged onto the second photodetector 32. Accordingly, the second photodetector 32 detects the tracking error signal, focus error signal, and main data signal at the time of the reproduction of the signal surface 2b of the DVD 2.

In this case, the spherical aberration generated by an optical condensing system disposed on the optical axis between the red semiconductor laser 31 and the signal surface 2b of the DVD 2 is corrected by the aberration correction element 21. When the spherical aberration is minimized, the distance between the objective lens 22 and the laser beam incidence surface 2a of the DVD 2, that is, the working distance is about 0.35 mm.

As described above, a non-polarization optical system is disposed on the DVD 2 side, but the linearly polarized light crossing the forward path at right angles is formed, and therefore the red semiconductor laser 31 is hardly influenced by the second reflected light.

Next, an infrared semiconductor laser 41 side for the CD 3 will be described. The third laser light L3 having a wavelength λ3=780 nm emitted from the infrared semiconductor laser 41 is a divergent light of the linear polarization (p-polarized light), and this divergent light passes through a hologram element 43 in the integrated device for CD 40 to form a parallel light in a collimator lens 44.

It is to be noted that the integrated device for CD 40 has a constitution substantially similar to that of the integrated device for DVD 30, and is constituted by integrating the infrared semiconductor laser 41, a third photodetector 42 disposed on the right side of the infrared semiconductor laser 41, and the hologram element 43 disposed above the infrared semiconductor laser 41 and the third photodetector 42 on a semiconductor substrate (not shown).

Moreover, the third laser light L3 transmitted through the collimator lens 44 passes through a concave lens 45 to form a divergent light, and passes through a phase plate 46 to form a circularly polarized light. The light is reflected by the dichroic film 16a of the second dichroic prism 16 to change the ray direction by 90°. The phase plate 46 applies a phase difference of (λ3)/4 at the time of the transmission of the third laser light L3 having the wavelength λ3. Thereafter, the ray direction is changed by 90° in the plane mirror 17 for rising. Furthermore, for the divergent light of the third laser light L3, the aperture is limited in the outer circular region of the aberration correction element 21 so that the numerical aperture (NA) into the objective lens 22 is 0.45. However, the spherical aberration is corrected by the 1st order light whose diverging degree was set to be stronger than that of the second laser light L2 and which was diffracted in the inner circular region. Thereafter, the divergent light by the diffracted 1st order light whose diverging degree is stronger than that of the second laser light L2 is incident upon the objective lens 22, and a third laser beam obtained by focusing the third laser light L3 by the objective lens 22 is incident via the laser beam incidence surface 3a of the CD 3 and is converted on the signal surface 3b.

It is to be noted that the function of the aberration correction element 21 with respect to the third laser light L3 will be described later in detail.

Thereafter, the reproducing, recording, or deleting is performed with respect to the signal surface 3b of the CD 3 by the third laser beam converged on the objective lens 22.

Furthermore, a returning third reflected light by the third laser beam reflected on the signal surface 3b of the CD 3 thereafter forms a circularly polarized light turned in reverse to that of the forward path, and is incident upon the objective lens 22. A third reflected light of the 1st order light is formed into the convergent light flux by the objective lens 22 and aberration correction element 21, changes the ray direction by 90° by the plane mirror 17, and is reflected by the dichroic film 16a of the dichroic prism 16. The light passes through the phase plate 46 to form a linearly polarized light (s-polarized light) reverse to the light of the forward path. The light is formed into a parallel light by the concave lens 45 and then into the convergent light by the collimator lens 44, diffracted by the hologram element 43 in the integrated device for CD 40, and converged onto the third photodetector 42. Accordingly, the third photodetector 42 detects the tracking error signal, focus error signal, and main data signal at the time of the reproduction of the signal surface 3b of the CD 3.

In this case, the spherical aberration generated by an optical condensing system disposed on the optical axis between the infrared semiconductor laser 41 and the signal surface 3b of the CD 3 is corrected by finite correction by the concave lens 45 and by wave front correction by the aberration correction element 21. When the spherical aberration is minimized, the distance between the objective lens 22 and the laser beam incidence surface 3a of the CD 3, that is, the working distance is about 0.14 mm.

As described above, a non-polarization optical system is also disposed on the CD 3 side, but the linearly polarized light crossing the forward path at right angles is formed, and therefore the infrared semiconductor laser 41 is hardly influenced by the third reflected light.

Here, the aberration correction element 21 and objective lens 22 forming the main part of the embodiment will be described in order with reference to FIGS. 5A to 13.

Figure 5A:
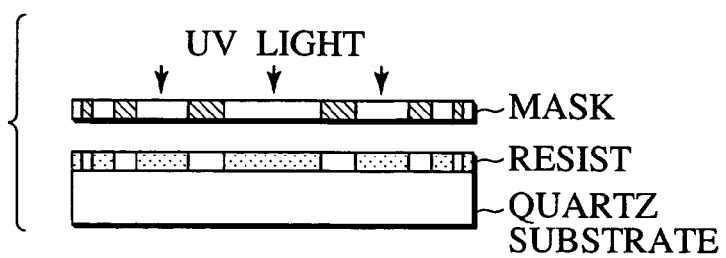
FIGS. 5A to 5C are process diagrams showing Preparation Method 1 of an aberration correction element shown in FIG. 4.
Figure 5B:
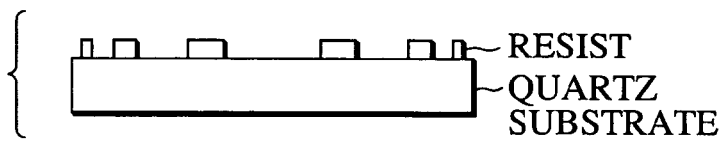
Figure 5C:
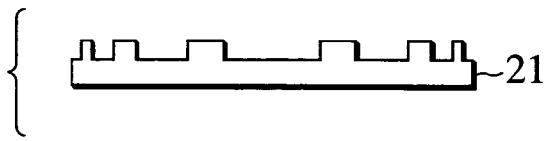
Figure 6A:
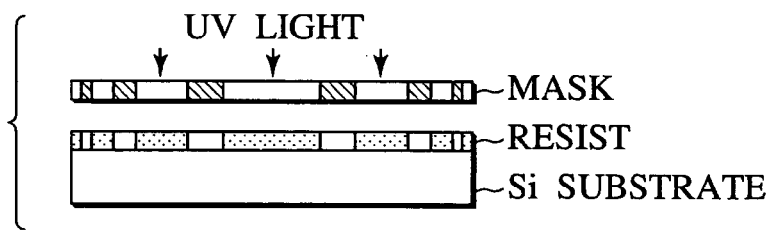
FIGS. 6A to 6F are process diagrams showing Preparation Method 2 of the aberration correction element shown in FIG. 4.
Figure 6B:
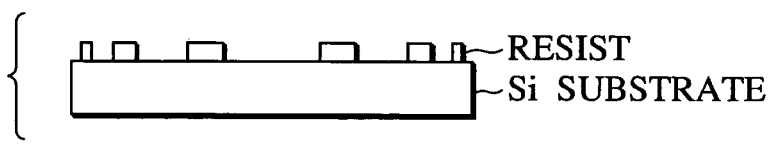
Figure 6C:
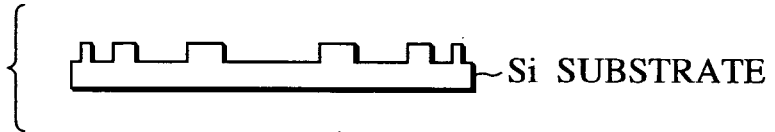
Figure 6D:
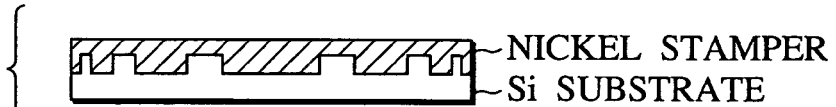
Figure 6E:
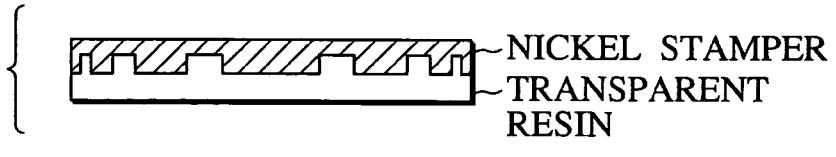
Figure 6F:
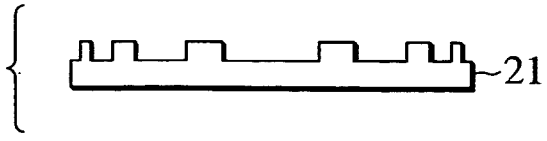
Figure 8:
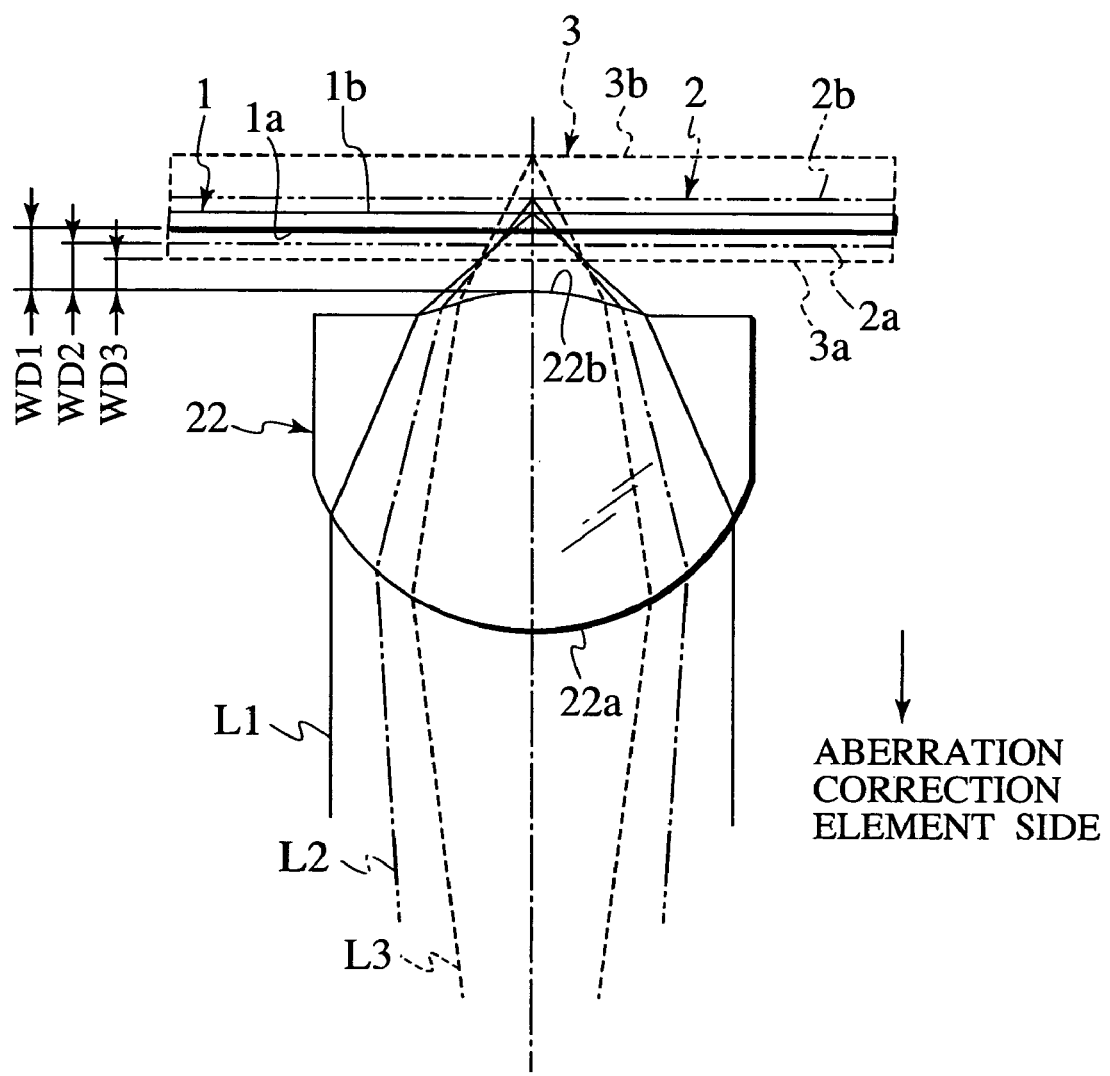
FIG. 8 is an enlarged diagram showing a case where an extra-high density optical disc or DVD or CD is recorded or reproduced using an objective lens optimized in an infinitely conjugated state for the extra-high density optical disc.
Figure 9:
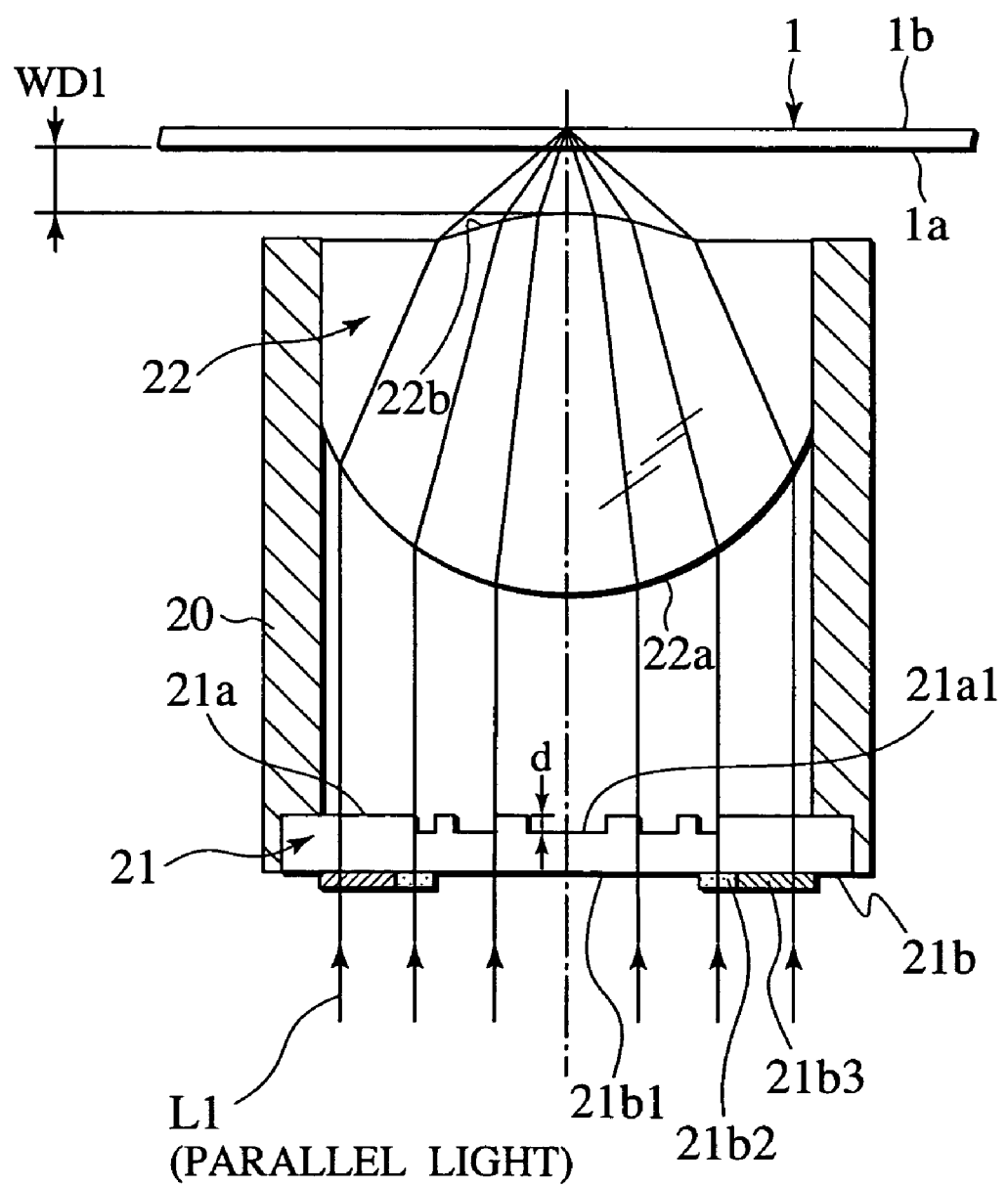
FIG. 9 is a diagram schematically showing a case where the extra-high density optical disc is recorded or reproduced with the aberration correction element shown in FIGS. 7A to 7C and the objective lens shown in FIG. 8.
Figure 10:
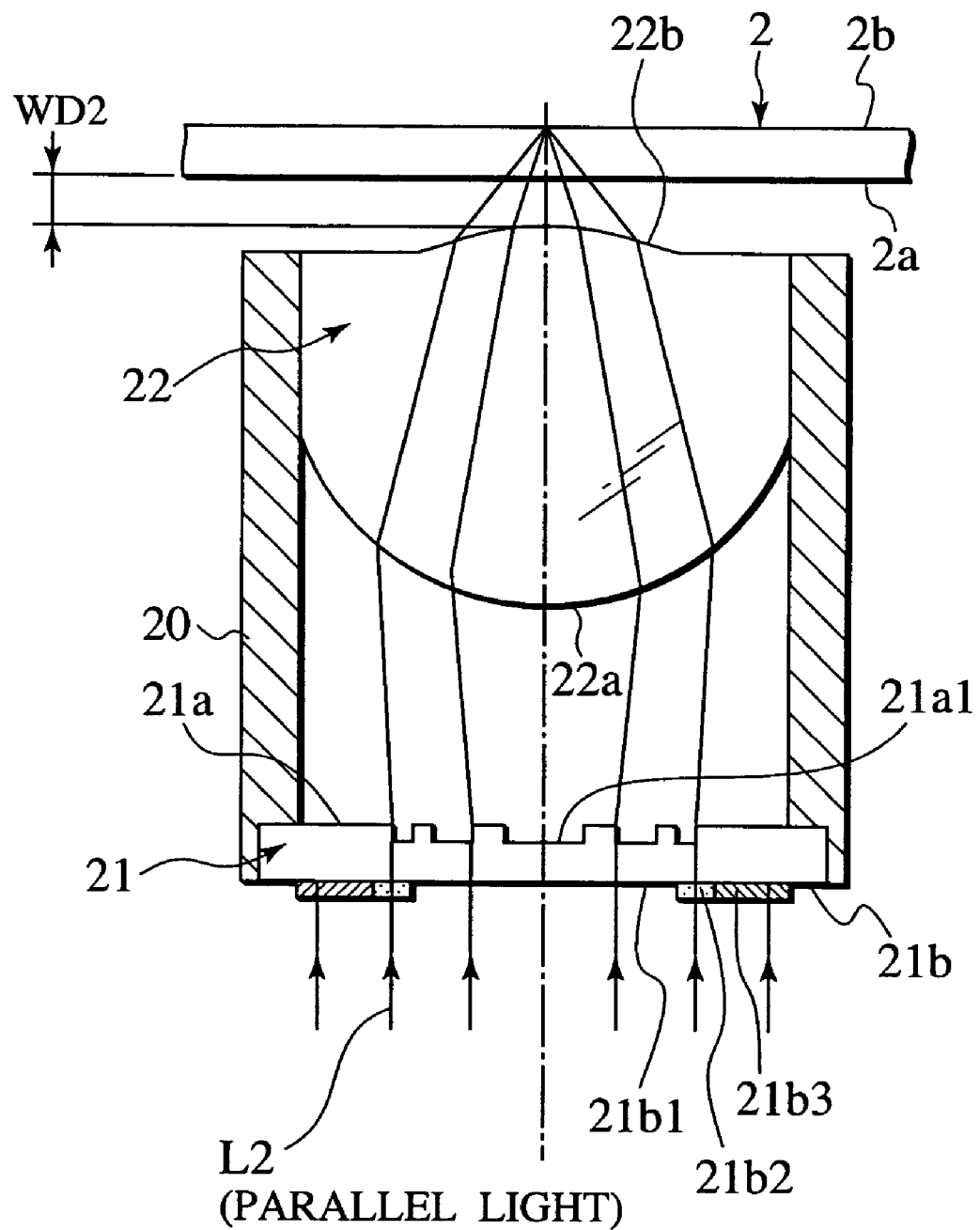
FIG. 10 is a ray diagram showing a case where the DVD is recorded or reproduced with the aberration correction element shown in FIGS. 7A to 7C and the objective lens shown in FIG. 8.
Figure 11:
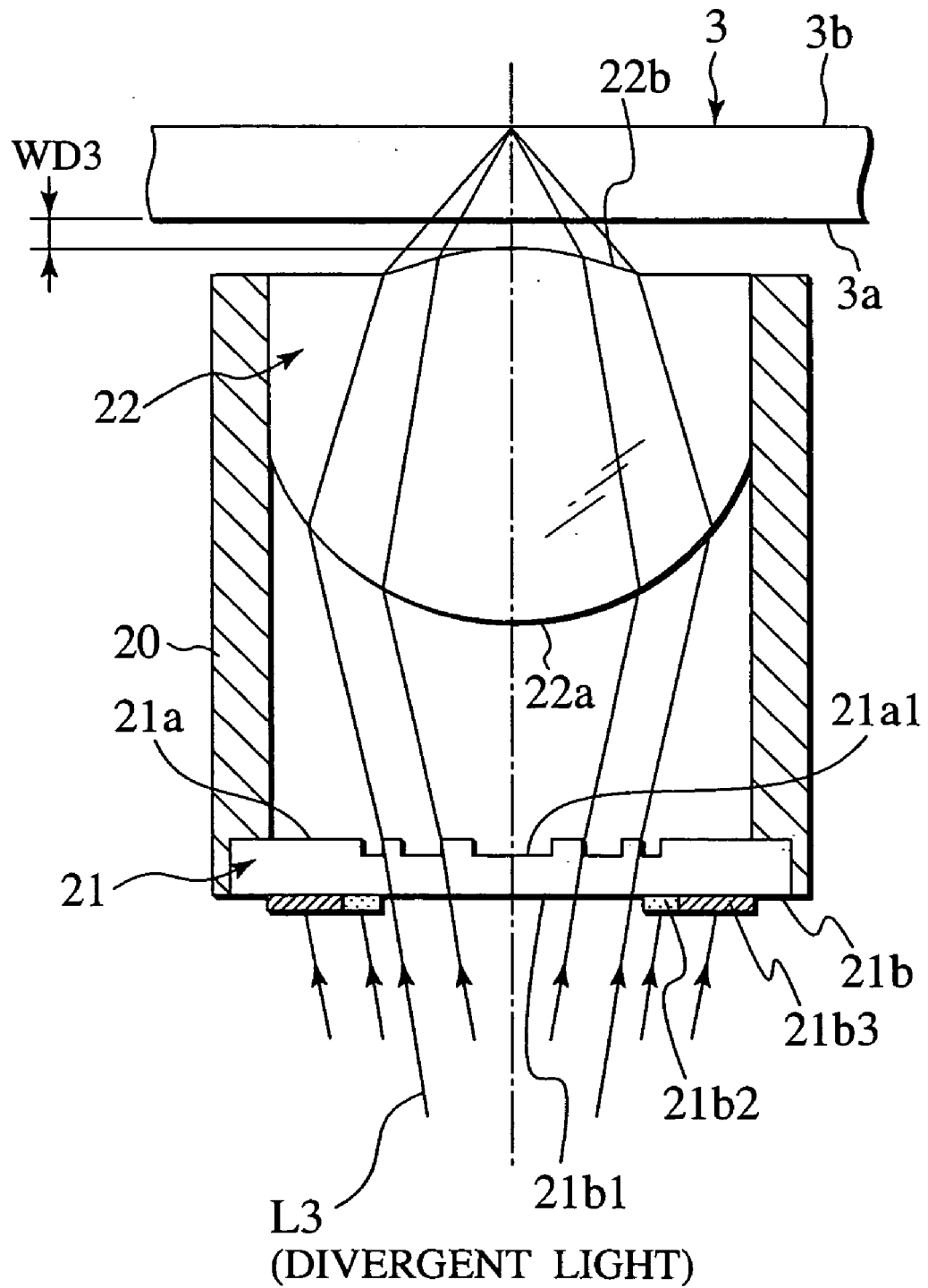
FIG. 11 is a ray diagram showing a case where the CD is recorded or reproduced with the aberration correction element shown in FIGS. 7A to 7C and the objective lens shown in FIG. 8.
Figure 12:
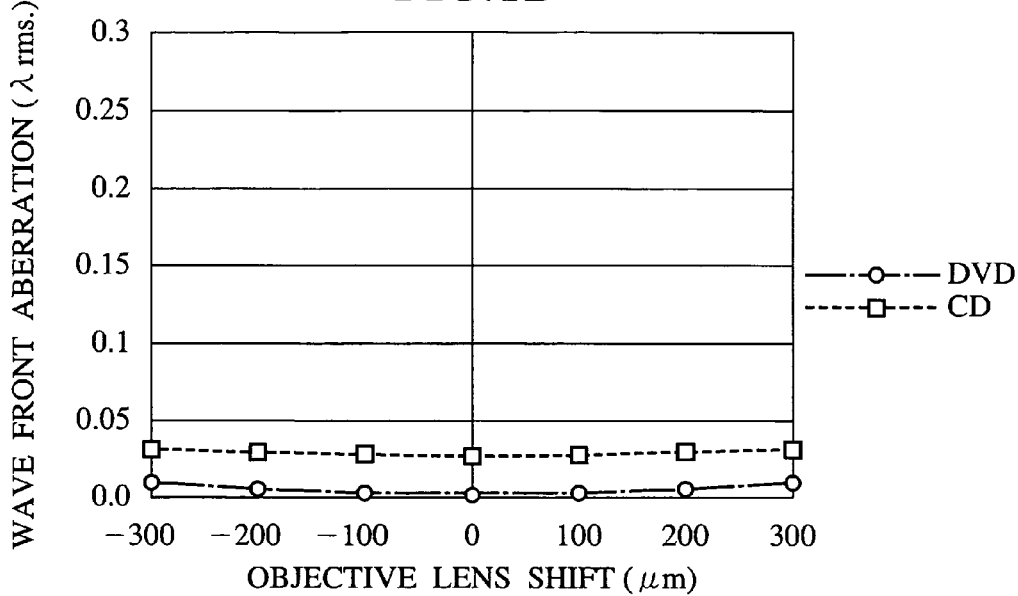
FIG. 12 is a diagram showing a wave front aberration in a best image surface at the objective lens shift time with respect to the DVD or CD, when the DVD or CD is recorded or reproduced with the aberration correction element shown in FIGS. 7A to 7C and the objective lens shown in FIG. 8.
Figure 13:
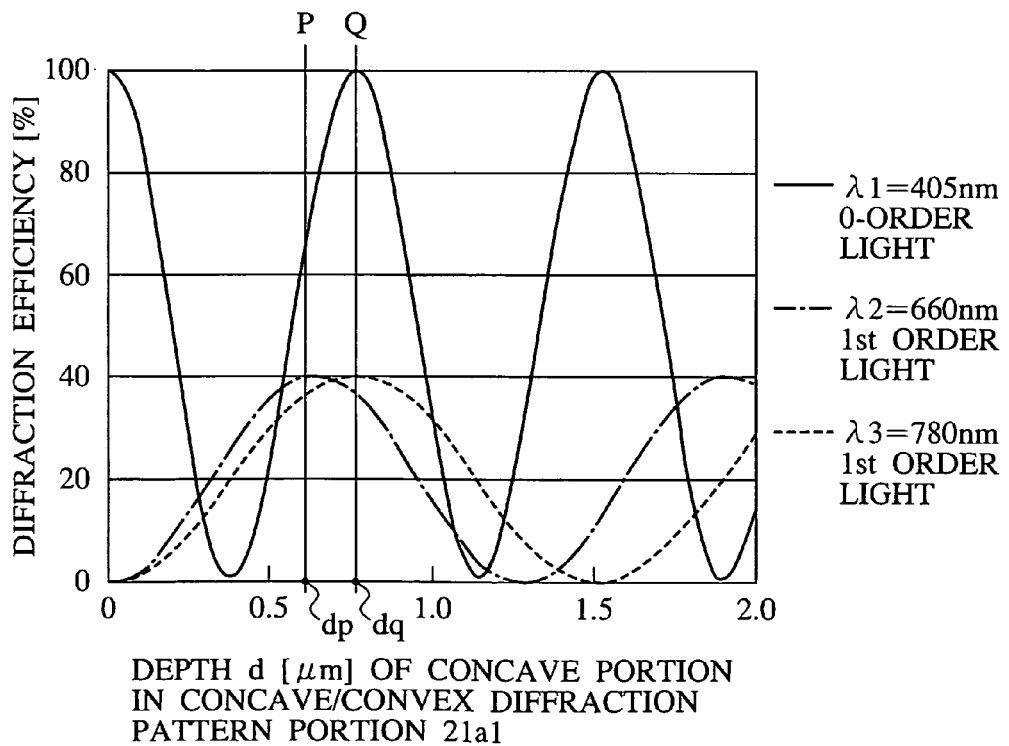
FIG. 13 is a diagram showing a relation between each diffraction efficiency at a time at which first to third laser lights having wavelengths λ1 to λ3 are incident upon the aberration correction element shown in FIGS. 7A to 7C and a depth of a concave portion in a concave/convex diffraction pattern portion.

FIGS. 5A to 5C are process diagrams showing Preparation Method 1 of the aberration correction element in the embodiment shown in FIG. 4. FIGS. 6A to 6F are process diagrams showing Preparation Method 2 of the aberration correction element in the embodiment shown in FIG. 4., FIGS. 7A to 7C are explanatory views of the aberration correction element in the embodiment shown in FIG. 4, where FIG. 7A is a top plan view, FIG. 7B is a front view, and FIG. 7C is a concave/convex shape diagram of a concave/convex diffraction pattern portion. FIG. 8 is an enlarged diagram showing a case where the extra-high density optical disc, DVD, or CD is recorded or reproduced using the objective lens optimized in the infinitely conjugated state for the extra-high density optical disc. FIG. 9 is a diagram schematically showing a case where the extra-high density optical disc is recorded or reproduced with the aberration correction element shown in FIGS. 7A to 7C and the objective lens shown in FIG. 8. FIG. 10 is a ray diagram showing a case where the DVD is recorded or reproduced with the aberration correction element shown in FIGS. 7A to 7C and the objective lens shown in FIG. 8. FIG. 11 is a ray diagram showing a case where the CD is recorded or reproduced with the aberration correction element shown in FIGS. 7A to 7C and the objective lens shown in FIG. 8. FIG. 12 is a diagram showing a wave front aberration in a best image surface at the objective lens shift time with respect to the DVD or CD, when the DVD or CD is recorded or reproduced with the aberration correction element shown in FIGS. 7A to 7C and the objective lens shown in FIG. 8. FIG. 13 is a diagram showing a relation between each diffraction efficiency at a time at which the first to third laser lights having the wavelengths $\lambda 1$ to $\lambda 3$ are incident upon the aberration correction element shown in FIGS. 7A to 7C and a depth of a concave portion in the concave/convex diffraction pattern portion.

To prepare the aberration correction element 21 constituting the main part of the present invention, either of Preparation Method 1 shown in FIGS. 5A to 5C and Preparation Method 2 shown in FIGS. 6A to 6F is used.

First, Preparation Method 1 of the aberration correction element 21 will be described. In an exposure process shown in FIG. 5A, a mask for the concave/convex diffraction pattern portion of the aberration correction element 21 described later is prepared by an electron drawing device, this mask is allowed to face a resist formed on, for example, a quartz substrate having light-transparency, the mask is irradiated with a UV light from above, and the resist is exposed to the UV light passed through openings in the mask. Next in a development process shown in FIG. 5B, a resist portion exposed to the UV light is removed to expose a part of the quartz substrate, and a resist portion which has not been exposed to the UV light on the quartz substrate is left. Next in an etching/resist removing process shown in FIG. 5C, the portion exposing the quartz substrate is etched using an etching solution. Thereafter, when the resist left on the quartz substrate is removed, the concave/convex diffraction pattern portion is formed on the quartz substrate, and the aberration correction element 21 is prepared using the quartz substrate. In this case, the mask is prepared beforehand so that a large number of aberration correction elements 21 can be prepared by the quartz substrate. In a stage in which the etching/resist removing process ends, a large number of aberration correction elements 21 are cut from the quartz substrate. Then, a large number of aberration correction elements 21 can be prepared by the quartz substrate, and cost of the aberration correction element 21 can be reduced.

On the other hand, Preparation Method 2 of the aberration correction element 21 will be described. Instead of the quartz substrate having the light-transparency, an opaque Si substrate is used. In a process of FIGS. 6A to 6C, the process of FIGS. 5A to 5C is performed, and the concave/convex diffraction pattern portion is formed on an Si substrate. Thereafter, in a stamper preparation process shown in FIG. 6D, a nickel stamper is prepared in which the concave/convex diffraction pattern portion is reversed by electroforming. Next, in a transfer process shown in FIG. 6E, the concave/convex diffraction pattern portion of the nickel stamper is transferred onto a transparent resin molten by molding by use of the nickel stamper. Next, in a stamper peeling process shown in FIG. 6F, when the nickel stamper is peeled from the transparent resin, the same concave/convex diffraction pattern portion as that formed on the Si substrate is formed, the aberration correction element 21 using the transparent resin material can be repeatedly prepared many times, and the cost of the aberration correction element 21 can be further reduced using the transparent resin material with an inexpensive material cost.

Moreover, in the example, Preparation Method 1 described above is applied. As a glass material, instead of using the quartz substrate shown in FIG. 5A, borosilicate crown glass (BK7) having a thickness, for example, of 0.925 mm is used to prepare the aberration correction element 21 in a shape shown in FIGS. 7A to 7C.

That is, as shown in FIGS. 7A and 7B, the aberration correction element 21 in the example is formed in a outer configuration of a 5 mm square using borosilicate crown glass (BK7) having light-transparency and having a thickness of 0.925 mm. Moreover, a concave/convex diffraction pattern portion 21a1 is formed in an inner circular region having a diameter of ϕ2.6 mm centering on a center "O" on an upper surface 21a side facing the objective lens 22 (FIG. 4). Furthermore, an outer circular region adjacent to an outer periphery of the concave/convex diffraction pattern portion 21a1 forms a flat upper surface 21a on which any concave/convex diffraction pattern portion is not formed.

Moreover, as shown in FIG. 7C, in the concave/convex diffraction pattern portions 21a1 formed in a concave/convex form on the upper surface 21a of the aberration correction element 21, a plurality of annular concave/convex pattern are formed in such a manner that a concave/convex repeating period T is gradually shortened or lengthened toward an outer circular portion from an inner circular portion.

Turning back to FIGS. 7A and 7C, a light-transparent flat portion 21b1 is formed in a circular shape in the inner circular region having a diameter ϕ2.18 mm or less centering on the center "O" at the reverse side of the concave/convex diffraction pattern portion 21a1. Moreover, an aperture limiting portion 21b2 for the third laser light is formed in an annular film using a dichroic film so as to limit a numerical aperture into the objective lens 22 with respect to the third laser light L3 in an outer circular region having a diameter ϕ2.18 mm or more and ϕ2.6 mm or less, adjacent to the periphery of the light-transparent flat portion 21b1. Furthermore, an aperture limiting portion 21b3 for the second laser light is formed in an annular film using a dichroic film so as to limit a numerical aperture into the objective lens 22 with respect to the second laser light L2 in an outer circular region having a diameter ϕ2.6 mm or more and ϕ3.74 mm or less, adjacent to the periphery of the aperture limiting portion for the third laser light 21b2.

In this case, the aperture limiting portion 21b2 for the third laser light formed on an undersurface 21b of the aberration correction element 21 has characteristics that the first laser light L1 having a wavelength λ1=405 nm±8 nm emitted from the blue semiconductor laser 11 (FIG. 4) is transmitted by the dichroic film having a wavelength selecting property and that the second laser light L2 having a wavelength λ2=660 nm±10 nm emitted from the red semiconductor laser 31 (FIG. 4) is transmitted. On the other hand, the third laser light L3 having a wavelength λ3=780 nm±10 nm emitted from the infrared semiconductor laser 41 (FIG. 4) is interrupted.

Moreover, the aperture limiting portion 21b3 for the second laser light formed on the undersurface 21b of the aberration correction element 21 has characteristics that the first laser light L1 having a wavelength λ1=405 nm±8 nm emitted from the blue semiconductor laser 11 (FIG. 4) is transmitted by the dichroic film having a wavelength selecting property and that the second laser light L2 having a wavelength λ2=660 nm±10 nm emitted from the red semiconductor laser 31 (FIG. 4) is interrupted. Additionally, the third laser light L3 having a wavelength λ3=780 nm±10 nm emitted from the infrared semiconductor laser 41 (FIG. 4) is interrupted.

It is to be noted that instead of forming the dichroic film having the wavelength selecting property as the aperture limiting portion for the third laser light 21b2 and the aperture limiting portion for the second laser light 21b3 formed on the undersurface 21b of the aberration correction element 21, a concave/convex diffraction pattern having a similar performance and having a concave/convex dimension different from that of the concave/convex diffraction pattern portion 21a1 may also be formed in the annular form in the outer circular region.

Furthermore, when reflection preventive films (not shown) each having a reflectance of 0.5% or less are formed on the upper surface 21a and the undersurface 21b of the aberration correction element 21, a transmittance is 98% or more.

Therefore, in the aberration correction element 21, the circular light-transparent flat portion 21b1 and the annular aperture limiting portion 21b2 for the third laser light and the annular aperture limiting portion 21b3 for the second laser light are formed in order toward the outer circular portion from the central portion on the undersurface 21b on the side of the first to third laser light sources 11, 31, 41. Moreover, the diffraction pattern portion 21a1 is formed on the inner circular region of the upper surface 21a on an objective lens 22 side, and the outer side of this diffraction pattern portion 21a1 is formed to be flat.

In this case, when borosilicate crown glass (BK7) is used as the glass material of the aberration correction element 21, a refractive index N1 with respect to the first laser light L1 having the wavelength λ1=405 nm emitted from the blue semiconductor laser 11 (FIG. 4) is 1.5302, and a refractive index N2 with respect to the second laser light L2 having the wavelength λ2=660 nm emitted from the red semiconductor laser 31 (FIG. 4) is 1.5142. Furthermore, a refractive index N3 with respect to the third laser light L3 having the wavelength λ3=780 nm emitted from the infrared semiconductor laser 41 is 1.5112.

Moreover, as in FIG. 7C, in the inner circular region of the upper surface 21a of the aberration correction element 21, a depth d1 of the concave portion in the concave/convex diffraction pattern portion 21a1 whose step number is one is obtained from the following equation (1) so as to prevent a diffraction function with respect to the first laser light L1 having the wavelength λ1=405 nm emitted from the blue semiconductor laser 11 (FIG. 4). The 0-order light of the first laser light L1 is transmitted as such without being diffracted. That is, when a depth d of the concave portion in the concave/convex diffraction pattern portion 21a1 is an integer times a phase difference 2π, a 0-order diffraction efficiency is 100%.

$$d = \frac{(\lambda 1) \times k}{(N1) - 1}, \quad (1)$$

where d is the depth of the concave portion in the concave/convex diffraction pattern portion 21a1;

λ1 is the wavelength of the first laser light L1;

N1 is a refractive index of the aberration correction element 21 with respect to the first laser light L1; and k is a natural number.

Assuming that the natural number k in the above equation (1) is 1, the depth d of the concave portion in the concave/ convex diffraction pattern portion 21a1 formed on the upper surface 21a of the aberration correction element 21 is 0.763 μm.

Furthermore, in the concave/convex diffraction pattern portion 21a1 formed on the upper surface 21a of the aberration correction element 21, when the DVD 2 is irradiated with the 1st order light obtained by diffracting the parallel light of the second laser light L2 having the wavelength λ2=660 nm emitted from the red semiconductor laser 31 (FIG. 4) described later via the objective lens 22, a spot of the second laser light L2 on the signal surface 2b of the DVD 2 (FIG. 4) corresponds to the numerical aperture (NA)=0.6. A phase difference in a distance x in a radial direction from the center "O" of the concave/convex diffraction pattern portion 21a1 is obtained by a phase difference function Φ(x) shown in the following equation (2) so that the spherical aberration of the 1st order light of the second laser light L2 is minimized. When the phase difference is binarized, the concave/convex shape in the radial direction is determined.

$$\Phi(x) = \frac{2\pi m}{(\lambda 2)} \times (A_2 x^2 + A_4 x^4 + A_6 x^6 + A_8 x^8), \quad (2)$$

where Φ(x) is a phase difference function;

m is a diffraction degree;

$A_2$ to $A_8$ are phase difference function coefficients of second to eighth orders;

x is a distance in the radial direction from the center "O" of the concave/convex diffraction pattern portion 21a1; and λ2 is a wavelength of the second laser light L2.

Examples of the phase difference function coefficients $A_2$ to $A_8$ in the phase difference function Φ(x) in the above equation (2) are shown in Table 1.

TABLE 1

| | |
|---|---|
| $A_2$ | 102.632072 |
| $A_4$ | −6.671030 |
| $A_6$ | 2.521836 |
| $A_8$ | −1.137079 |

Next, as shown in FIG. 8, the objective lens 22 constituting the main part of the embodiment is designed for the extra-high density optical disc, for example, optical glass manufactured by HOYA (NBF1) is used as the glass material, the first surface 22a side facing the aberration correction element 21 is formed in a non-spherical surface, and the second surface 22b side facing the extra-high density optical disc 1, DVD 2, or CD 3 is also formed in the non-spherical surface.

In this case, a working distance WD1 between the second surface 22b of the objective lens 22 and the laser beam incidence surface 1a of the extra-high density optical disc 1 is about 0.5 mm, and a working distance WD2 between the second surface 22b of the objective lens 22 and the laser beam incidence surface 2a of the DVD 2 is about 0.35 mm. Furthermore, a working distance WD3 between the second surface 22b of the objective lens 22 and the laser beam incidence surface 3a of the CD 3 is about 0.14 mm.

Moreover, when optical glass manufactured by HOYA (NBF1) is used as the glass material of the objective lens 22, a refractive index N4 with respect to the first laser light L1 having the wavelength λ1=405 nm emitted from the blue semiconductor laser 11 (FIG. 4) is 1.768985, and a refractive index N5 with respect to the second laser light L2 having the wavelength λ2=660 nm emitted from the red semiconductor laser 31 (FIG. 4) is 1.738532. Furthermore, a refractive index N6 with respect to the third laser light L3 having the wavelength λ3=780 nm emitted from the infrared semiconductor laser 41 (FIG. 4) is 1.73317504.

Here, Table 2 shows specifications of the objective lens 22 designed to be optimum in the infinitely conjugated state so as to record on or reproduce from the extra-high density optical disc 1 by the first laser light L1 having the wavelength λ1=405 nm.

TABLE 2

| | |
|---|---|
| Designed wavelength | 405 nm |
| Numerical aperture (NA) | 0.85 |
| Focal distance | 2.20 mm |
| Incidence pupil diameter | 3.74 mm |
| Magnification | 0 time (parallel light) |

From Table 2, a designed wavelength λ1 of the first laser light L1 emitted from the blue semiconductor laser 11 (FIG. 4) is set, for example, to 405 nm, and the objective lens 22 having an numerical aperture (NA) of 0.85 is used.

Next, when the first surface 22a and the second surface 22b of the objective lens 22 are formed in the non-spherical surface, the non-spherical surface is represented by the following equation (3) which is a polynomial equation:

$$Z = \frac{Ch^2}{1 + \sqrt{1-(1+K)C^2h^2}} + B_4h^4 + B_6h^6 + B_8h^8 + B_{10}h^{10} + B_{12}h^{12}, \quad (3)$$

where Z is a distance from a vertex of the first surface 22a or the second surface 22b of the objective lens 22;

C is a curvature (1/curvature radius) of the first surface 22a or the second surface 22b;

h is a height from the optical axis of the objective lens 22;

K is a Korenich constant; and $B_4$ to $B_{12}$ are non-spherical surface coefficients of fourth to twelfth orders.

When the polynomial equation of the above equation (3) is used, the examples of the non-spherical surface coefficients $B_4$ to $B_{12}$ for forming the first surface 22a of the objective lens 22 in the non-spherical surface are shown in Table 3.

TABLE 3

| | |
|---|---|
| $B_4$ | −0.00092006967 |
| $B_6$ | −0.00025706693 |
| $B_8$ | −0.00057872391 |
| $B_{10}$ | 0.0002222827 |
| $B_{12}$ | −5.678923 × 10$^{-5}$ |

Moreover, when the polynomial equation of the above equation (3) is used, the examples of the non-spherical surface coefficients $B_4$ to $B_{10}$ for forming the second surface 22b of the objective lens 22 in the non-spherical surface are shown in Table 4.

TABLE 4

| | |
|---|---|
| $B_4$ | 0.61448774 |
| $B_6$ | −0.1395629 |
| $B_8$ | 0.12867014 |
| $B_{10}$ | −0.043733069 |

Furthermore, when the aberration correction element 21 shown in FIGS. 7A to 7C and the objective lens 22 shown in FIG. 8 are stored in the lens holder 20, optical surface relations with respect to the extra-high density optical disc 1, DVD 2, CD 3 are shown in Tables 5, 6, 7 in order as follows.

TABLE 5

| Optical surface forming member | Surface shape | Radius [mm] | Surface interval [mm] | Material | Korenich constant |
|---|---|---|---|---|---|
| Space | — | — | ∞ (parallel light) | — | — |
| Aberration correction element | — | — | 0.925 | BK7 | — |
| Space | — | — | 4.0 | — | — |
| Objective lens (first surface) | Non-spherical surface | 1.812171 | 3.104 | NBF1 | −0.337179 |
| Objective lens (second surface) | Non-spherical surface | −6.507584 | | | −845.651577 |
| Space | — | — | 0.50 | — | — |
| Extra-high density optical disc | — | — | 0.1 | Poly-carbonate | — |

TABLE 6

| Optical surface forming member | Surface shape | Radius [mm] | Surface interval [mm] | Material | Korenich constant |
|---|---|---|---|---|---|
| Space | — | — | ∞ (parallel light) | — | — |
| Aberration correction element | — | — | 0.925 | BK7 | — |
| Space | — | — | 4.0 | — | — |
| Objective lens (first surface) | Non-spherical surface | 1.812171 | 3.104 | NBF1 | −0.337179 |
| Objective lens (second surface) | Non-spherical surface | −6.507584 | | | −845.651577 |
| Space | — | — | 0.35 | — | — |
| DVD | — | — | 0.6 | Poly-carbonate | — |

TABLE 7

| Optical surface forming member | Surface shape | Radius [mm] | Surface interval [mm] | Material | Korenich constant |
|---|---|---|---|---|---|
| Space | — | — | 31.8 (divergent light) | — | — |
| Aberration correction element | — | — | 0.925 | BK7 | — |
| Space | — | — | 4.0 | — | — |
| Objective lens (first surface) | Non-spherical surface | 1.812171 | 3.104 | NBF1 | −0.337179 |

TABLE 7-continued

| Optical surface forming member | Surface shape | Radius [mm] | Surface interval [mm] | Material | Korenich constant |
|---|---|---|---|---|---|
| Objective lens (second surface) | Non-spherical surface | −6.507584 | | | −845.651577 |
| Space | — | — | 0.14 | — | — |
| CD | — | — | 1.2 | Poly-carbonate | — |

From Tables 5 to 7, the thickness of the aberration correction element 21 is 0.925 mm, and the space between the aberration correction element 21 and the objective lens 22 is 4.0 mm. The curvature radius in the vertex of the first surface 22*a* of the objective lens 22 is 1.812171 mm, the curvature radius in the vertex of the second surface 22*b* is −6.507584 mm, and a lens thickness of the objective lens 22 is 3.104 mm.

Next, the recording or reproducing of the extra-high density optical disc 1, DVD 2, CD 3 in a state in which the aberration correction element 20 shown in FIGS. 7A to 7C and the objective lens 22 shown in FIG. 8 are stored in the lens holder 20 will be described in order with reference to FIGS. 9 to 11.

Here, as shown in FIG. 9, when the extra-high density optical disc 1 is recorded or reproduced with the aberration correction element 21 and objective lens 22 stored in the lens holder 20, the first laser light L1 having the wavelength $\lambda 1$=405 nm emitted from the blue semiconductor laser 11 (FIG. 4) is formed in the parallel light in the collimator lens 12 (FIG. 4) in a state in which the working distance WD1 between the second surface 22*b* of the objective lens 22 and the laser beam incidence surface 1*a* of the extra-high density optical disc 1 is set to about 0.5 mm. The parallel light is passed as such through the light-transparent flat portion 21*b*1 formed in the circular shape in the inner circular region of the undersurface 21*b* of the aberration correction element 21, and the aperture limiting portion 21*b*2 for the third laser light and the aperture limiting portion 21*b*3 for the second laser light formed in an annular shape in order using the dichroic film outside the light-transparent flat portion 21*b*1. Furthermore, the parallel light is further transmitted as the 0-order light without being diffracted in the concave/convex diffraction pattern portion 21*a*1 formed in the inner circular region of the upper surface 21*a* of the aberration correction element 21, and the light remains to be the parallel light, and is incident upon the first surface 22*a* of the objective lens 22.

Moreover, the first laser beam focused by the first and second surfaces 22*a*, 22*b* of the objective lens 22 is incident upon the laser beam incidence surface 1*a* of the extra-high density optical disc 1, and is converged onto the signal surface 1*b* having a disc substrate thickness of 0.1 mm.

In this case, since any diffraction does not occur with respect to the first laser light L1 having the wavelength $\lambda 1$=405 nm in the concave/convex diffraction pattern portion 21*a*1 formed in the upper surface 21*a* of the aberration correction element 21, any loss is not generated in quantity of light in the aberration correction element 21 except reflection or absorption. When the depth d of the concave portion in the concave/convex diffraction pattern portion 21*a*1 is set to 0.763 μm as described above, the diffraction efficiency of the 0-order light is 100%. At this time, since an output of the blue semiconductor laser 11 (FIG. 4) having the wavelength λ1=405 nm is low, it is indispensable that the loss in the quantity of light is little in each optical component of the optical pickup device 10 of the embodiment.

Next, as shown in FIG. 10, when the DVD 2 is recorded or reproduced with the aberration correction element 21 and objective lens 22 stored in the lens holder 20, the second laser light L2 having the wavelength λ2=660 nm emitted from the red semiconductor laser 31 (FIG. 4) is formed in the parallel light in the collimator lens 34 (FIG. 4) in a state in which the working distance WD2 between the second surface 22b of the objective lens 22 and the laser beam incidence surface 2a of the DVD 2 is set to about 0.35 mm. The parallel light is interrupted by the aperture limiting portion 21b3 for the second laser light formed in the annular form using the dichroic film in the outer circular region of the undersurface 21b of the aberration correction element 21, and the aperture is limited to set the numerical aperture (NA) into the objective lens 22 to 0.6. Even in this case, after transmitted through the light-transparent flat portion 21b1 formed in the circular shape in the inner circular region of the undersurface 21b of the aberration correction element 21 and the aperture limiting portion 21b2 for the third laser light formed in the annular shape using the dichroic film outside the light-transparent flat portion 21b1, the parallel light of the second laser light L2 is diffracted by the concave/convex diffraction pattern portion 21a1 formed in the inner circular region of the upper surface 21a of the aberration correction element 21. The 1st order light as divergent light obtained by the diffraction is incident upon the first surface 22a of the objective lens 22 to correct a spherical aberration thereon.

Moreover, the second laser beam focused by the first and second surfaces 22a, 22b of the objective lens 22 is incident upon the laser beam incidence surface 2a of the DVD 2, and converged onto the signal surface 2b having a disc substrate thickness of 0.6 mm.

In this case, since the objective lens 22 is designed for the extra-high density optical disc, the spherical aberration is large with respect to the second laser light L2 having the wavelength λ2=660 nm emitted from the red semiconductor laser 31 (FIG. 4). However, since the wave front correction is performed with respect to the second laser light L2 in the concave/convex diffraction pattern portion 21a1 formed in the upper surface 21a of the aberration correction element 21 to correct the spherical aberration, any trouble is not caused in the recording or reproducing of the DVD 2.

Furthermore, as shown in FIG. 11, when the CD 3 is recorded or reproduced with the aberration correction element 21 and objective lens 22 stored in the lens holder 20, the third laser light L3 having the wavelength λ3=780 nm emitted from the infrared semiconductor laser 41 (FIG. 4) is formed into a parallel light by the collimator lens 44 (FIG. 4) and further into a divergent light by the concave lens 45 (FIG. 4) in a state in which the working distance WD3 between the second surface 22b of the objective lens 22 and the laser beam incidence surface 3a of the CD 3 is set to about 0.14 mm. The divergent light is interrupted by the aperture limiting portion 21b2 for the third laser light and the aperture limiting portion 21b3 for the second laser light formed in an annular shape in order using the dichroic film in the outer circular region of the undersurface 21b of the aberration correction element 21, and the aperture is limited so as to set the numerical aperture (NA) into the objective lens 22 to 0.45. Even in this case, after transmitted through the light-transparent flat portion 21b1 formed in the circular shape in the inner circular region of the undersurface 21b of the aberration correction element 21, the divergent light of the third laser light L3 is diffracted to be divergent light having a larger degree in diffusion than that of the second laser light L2 by the concave/convex diffraction pattern portion 21a1 formed in the inner circular region of the upper surface 21a of the aberration correction element 21. The 1st order light as divergent light obtained by the diffraction is incident upon the first surface 22a of the objective lens 22 to correct a spherical aberration thereon.

Moreover, the third laser beam focused by the first and second surfaces 22a, 22b of the objective lens 22 is incident upon the laser beam incidence surface 3a of the CD 3, and converged onto the signal surface 3b having a disc substrate thickness of 1.2 mm.

In this case, since the objective lens 22 is designed for the extra-high density optical disc, the spherical aberration is large with respect to the third laser light L3 having the wavelength λ3=780 nm emitted from the infrared semiconductor laser 41 (FIG. 4). However, the period T (FIG. 7C) of the concave/convex diffraction pattern portion 21a1 formed in the upper surface 21a of the aberration correction element 21 is designed to be optimum with respect to the second laser beam. Therefore, the wave front correction is performed with respect to the third laser light L3 by the concave/convex diffraction pattern portion 21a1. Furthermore, when the third laser light L3 formed into the divergent light using the concave lens 45 (FIG. 4) is incident upon the aberration correction element 21, finite correction is performed with respect to an insufficient spherical aberration correction amount. Since the wave front correction is combined with the finite correction to correct the spherical aberration, any trouble is not caused in the recording or reproducing of the CD 3.

From the above description, in the optical pickup device 10 of the present invention, the light flux of the first to third laser lights L1 to L3 is preferably incident upon the aberration correction element 21 in the form of the parallel light if possible, rather than the divergent light. In this embodiment, the first laser light L1 for the extra-high density optical disc and the second laser light L2 for the DVD are incident upon the aberration correction element 21 in the form of the parallel light, and only the third laser light L3 for the CD is incident upon the aberration correction element 21 in the form of the divergent light. Therefore, even when the optical axes of the first and second laser lights L1, L2 slightly shift from the optical axis of the objective lens 22, the deterioration of the spherical aberration is reduced. Moreover, it is easy to adjust the optical axes at the time of the assembling of the optical pickup device in a case where the parallel light is incident upon the aberration correction element 21 as compared with the divergent light.

Moreover, although the third laser light L3 is incident upon the aberration correction element 21 in the form of the divergent light, the second laser light L2 is incident upon the aberration correction element 21 in the form of the parallel light. Therefore, at this time, the divergent light of the third laser light L3 can be incident upon the aberration correction element 21 while the diverging degree is suppressed (incident conjugated length is increased) as compared with the conventional example. As described later, the wave front aberration with respect to the DVD 2, CD 3 at the objective lens shift time can be enhanced as compared with the conventional example.

Here, as described above, when the optical pickup device 10 shown in FIG. 4 is assembled, the objective lens shift amount by the shift of the optical axes of three types of optical systems and the objective lens 22 is important. FIG. 12 shows a wave front aberration with respect to the DVD 2, CD 3, when an allowable range of a shift amount of the objective lens 22 in the optical pickup device 10 is set to ±300 μm or less, and the objective lens 22 is shifted at an interval of 100 μm.

From FIG. 12, in both the DVD 2 and the CD 3, the wave front aberration at the objective lens shift time is 0.07 λrms. or less in Marechal criterion. In this embodiment, when the DVD 2 is recorded or reproduced, the second laser light L2 having the wavelength λ2 of 660 nm is incident upon the aberration correction element 21 in the form of the parallel light, and accordingly the wave front aberration at the objective lens shift time is satisfactory. When the CD 3 is recorded or reproduced, the third laser light L3 having the wavelength λ3 of 780 nm is incident upon the aberration correction element 21 in the form of the divergent light. However, the DVD 2 is designed in such a manner that the parallel light can be incident upon the aberration correction element 21. Accordingly, in the CD 3, since an incidence angle of the divergent light with respect to the aberration correction element 21 can be reduced (the incident conjugated length is large), the wave front aberration of the objective lens shift in the CD 3 is satisfactory.

Here, when the extra-high density optical disc 1, DVD 2, or CD 3 is selectively recorded or reproduced with the aberration correction element 21 and objective lens 22 stored in the lens holder 20, the concave/convex repeating period T (FIG. 7C) in the concave/convex diffraction pattern portion 21a1 formed in the upper surface 21a of the aberration correction element 21 is sufficiently large as compared with the wavelength. When the element is regarded as thin, an m-order diffraction efficiency ηm after the transmission through the concave/convex diffraction pattern portion 21a1 is represented by the following equation (4) using a scalar theory:

$$\eta_m = \left| \frac{1}{T} \int_0^T \exp\{j\Phi(x)\} \exp\left(-j\frac{2\pi mx}{T}\right) dx \right|^2, \quad (4)$$

where ηm denotes an m-order diffraction efficiency;

T denotes a period of the concave/convex portion in the concave/convex diffraction pattern portion 21a1;

Φ(x) denotes a phase difference function; and m denotes a diffraction order.

In this case, the concave/convex repeating period T in the concave/convex diffraction pattern portion 21a1 in the equation (4) is calculated as a certain value to facilitate the calculation. However, as described above, the concave/convex repeating period T in the concave/convex diffraction pattern portion 21a1 is formed to be gradually shortened or lengthened toward the outer from the inner in the radial direction of the aberration correction element 21.

Next, FIG. 13 shows a result of calculation of the diffraction efficiencies of the 0-order light of the first laser light L1, the 1st order light of the second laser light L2, and the 1st order light of the third laser light L3 using the above equation (4) at a time at which the first laser light L1 having the wavelength λ1=405 nm for the extra-high density optical disc, the second laser light L2 having the wavelength λ2=660 nm for the DVD, and the third laser light L3 having the wavelength λ3=780 nm for the CD are incident upon the concave/convex diffraction pattern portion 21a1 formed in the upper surface 21a of the aberration correction element 21.

Here, as described above, the depth d=0.763 μm of the concave portion in the concave/convex diffraction pattern portion 21a1 formed in the upper surface 21a of the aberration correction element 21 is a value designed for the first laser light L1 having wavelength λ1=405 nm for the extra-high density optical disc. When the depth d of the concave portion in the concave/convex diffraction pattern portion 21a1 is 0.763 μm (phase difference 2π with respect to the wavelength λ1), the diffraction efficiency of the 0-order light of the first laser light L1 is 100% on the line Q in FIG. 10.

On the other hand, when the depth d of the concave portion in the concave/convex diffraction pattern portion 21a1 is 0.763 μm, the diffraction efficiency of the 1st order light with respect to the second laser light L2 having the wavelength λ2=660 nm for the DVD is 37.1%. The diffraction efficiency of the 1st order light with respect to the third laser light L3 having the wavelength λ3=780 nm for the CD is 40.5%, and this value of 40.5% is a maximum diffraction efficiency with respect to the third laser light L3.

In the above description, conditions on which the diffraction efficiency of the 1st order light is maximized with respect to the second laser light L2 having the wavelength λ2=660 nm for the DVD are determined. As a result, the depth d of the concave portion in the concave/convex diffraction pattern portion 21a1 on a line P in FIG. 13 is 0.642 μm, and a maximum diffraction efficiency of the 1st order light with respect to the second laser light L2 at this time is 40.5%. On the other hand, when the depth d of the concave portion in the concave/convex diffraction pattern portion 21a1 is 0.642 μm, the diffraction efficiency of the 0-order light with respect to the first laser light L1 having the wavelength λ1=405 nm for the extra-high density optical disc is 77.2%. The diffraction efficiency of the 1st order light with respect to the third laser light indicating λ3=780 nm for the CD is 38.1%.

From the above description, to establish a system for recording or reproducing the extra-high density optical disc 1, DVD 2, and CD 3, it is preferable to obtain a high diffraction efficiency on the aberration correction element 21 with respect to all the first laser light L1 having wavelength λ1=405 nm, the second laser light L2 having the wavelength λ2=660 nm, and the third laser light L3 having the wavelength λ3=780 nm. In this case, the red semiconductor laser 31 (FIG. 4) having the wavelength λ2 of about 660 nm for the DVD having a high output can be produced in mass, but a high diffraction efficiency as high as possible is preferable. On the other hand, the blue semiconductor laser 11 (FIG. 4) having a wavelength λ1 of about 405 nm for the extra-high density optical disc has a low output, but a diffraction efficiency of 100% is not essential, and a slight drop in the diffraction efficiency is permitted. For example, there is a demand for a design in which a diffraction efficiency of 70% or more in the extra-high density optical disc 1 is secured, slight sacrifice is made, a high diffraction efficiency close to the maximum diffraction efficiency is kept in the DVD 2, CD 3, and a good balance is established.

In consideration of the above-described conditions, the depth d of the concave portion in the concave/convex diffraction pattern portion 21a1 formed in the upper surface 21a of the aberration correction element 21 is set to be between a depth capable of obtaining an approximately maximum diffraction efficiency with respect to the first laser light L1 and a depth capable of obtaining the approximately maximum diffraction efficiency with respect to the second laser light L2 (section held between the lines P and Q in FIG. 13). Then, a diffraction efficiency of 77% or more is obtained with respect to the first laser light L1 having the wavelength λ1=405 nm, and a diffraction efficiency of 37% or more is obtained with respect to the second laser light L2 having the wavelength λ2=660 nm and the third laser light L3 having the wavelength λ3=780 nm.

In this case, when the concave portion in the concave/convex diffraction pattern portion 21a1 formed in the upper surface 21a of the aberration correction element 21 is formed by etching by application of a semiconductor process, a depth error of about 10 nm is caused by etching precision. However, even when the depth d of the concave portion in the concave/convex diffraction pattern portion 21a1 deviates slightly from a designed value, a high diffraction efficiency can be secured in the section held between the lines P and Q in FIG. 13 (a range of a phase difference of 1.68π to 2π with respect to the wavelength λ1).

Furthermore, the concave/convex diffraction pattern portion 21a1 formed in the upper surface 21a of the aberration correction element 21 has a concave/convex structure whose step number is one. Therefore, −1st order light is generated symmetrically with the 1st order light of the second laser light L2 or a high-order light thereof is generated, but a diffracted light other than the 1st order light of the second laser light L2 is not formed into an image on the signal surface 2b of the DVD 2, and accordingly there is little influence.

It is to be noted that, in general, when a depth di of the whole concave portion in the n-valued (n−1 concave/convex steps) concave/convex diffraction pattern portion 21a1 satisfies a relation of the following equation (5) with respect to a laser light L1 having a wavelength λi, a primary diffraction efficiency is maximized.

$$di = \frac{n-1}{n} \times \frac{\lambda i}{Ni-1} \times k, \quad (5)$$

where n denotes a natural number of 2 or more;
di denotes the depth of the whole concave portion in the concave/convex diffraction pattern portion 21a1, at a time when the diffraction efficiency of the 1st order light having a wavelength λi is maximized;
λi denotes a wavelength of an i-th laser light Li;
Ni denotes a refractive index of the aberration correction element 21 with respect to the i-th laser light Li; and
k denotes a natural number.

Moreover, assuming that n=2 in the above equation (5), the refractive index of the aberration correction element 21 with respect to the second laser light L2 having the wavelength λ2 is N2, and a depth dp of the concave portion in the concave/convex diffraction pattern portion 21a1 corresponding to a line P in FIG. 13 in which the diffraction efficiency of the 1st order light is maximized is represented by the following equation (6):

$$dp = \frac{1}{2} \times \frac{(\lambda 2)}{(N2)-1} \quad (6)$$

Furthermore, in the aforementioned equation (1), the refractive index of the aberration correction element 21 with respect to the first laser light L1 having the wavelength λ1 is N1, and a depth dq of the concave portion in the concave/convex diffraction pattern portion 21a1 corresponding to a line Q in FIG. 13 in which the diffraction efficiency of the 0-order light is maximized is represented by the following equation (7):

$$dq = \frac{(\lambda 1)}{(N1)-1} \quad (7)$$

Here, when a range of the wavelength λ1 of the first laser light L1 is 403 nm or more and 415 nm or less, and a range of the wavelength λ2 of the second laser light L2 is 640 nm or more and 660 nm or less, the depths dp, dq of the concave portion in the concave/convex diffraction pattern portion 21a1 capable of obtaining the maximum diffraction efficiency are shown in Table 8.

TABLE 8

| Refractive index N1 | Refractive index N2 | dq [μm] λ1 = 403 nm | dq [μm] λ1 = 415 nm | dp [μm] λ2 = 640 nm | dp [μm] λ2 = 660 nm |
|---|---|---|---|---|---|
| 1.4 | 1.39 | 1.008 | 1.038 | 0.821 | 0.846 |
| 1.5 | 1.49 | 0.806 | 0.830 | 0.653 | 0.673 |
| 1.6 | 1.59 | 0.672 | 0.692 | 0.542 | 0.559 |
| 1.7 | 1.69 | 0.576 | 0.593 | 0.464 | 0.478 |

In the Table 8, for example, when the refractive indexes of the glass material of the aberration correction element 21 are N1=1.4 with respect to the first laser light L1 having the wavelength λ1=403 nm, and N2=1.39 with respect to the second laser light L2 having the wavelength λ2=640 nm, and the depth of the concave portion in the concave/convex diffraction pattern portion 21a1 is dp=0.821 μm or more, d1q=1.038 μm or less, the diffraction efficiencies of the first and second laser lights L1, L2 can be well balanced. As apparent also from FIG. 13, changes of the diffraction efficiencies are gentle in the vicinity of d1q, dp.

Moreover, when the wavelength λ1 is 403 nm or more and 415 nm or less, the wavelength λ2 is 640 nm or more and 660 nm or less, the wavelength λ3 is 770 nm or more and 790 nm or less, and the respective refractive indexes of the glass material of the aberration correction element 21 are as shown in Table 9, the depths dp and dq are set to maximum widths, and the diffraction efficiency at this time is shown in Table 9.

TABLE 9

| Refractive index | Depth [μm] | 0-order diffraction efficiency of λ 1 [%] 403 nm | 0-order diffraction efficiency of λ 1 [%] 415 nm | Primary diffraction efficiency of λ 2 [%] 640 nm | Primary diffraction efficiency of λ 2 [%] 660 nm |
|---|---|---|---|---|---|
| N1 = 1.4 | 0.821 to | 70.2 to | 63.3 to | 33.9 to | 35.6 to |
| N2 = 1.39 | 1.038 | 100.0 | 100.0 | 40.5 | 40.5 |
| N1 = 1.5 | 0.653 to | 68.9 to | 62.0 to | 33.6 to | 35.3 to |
| N2 = 1.49 | 0.830 | 100.0 | 100.0 | 40.5 | 40.5 |
| N1 = 1.6 | 0.542 to | 68.0 to | 61.0 to | 33.4 to | 35.1 to |
| N2 = 1.59 | 0.692 | 100.0 | 100.0 | 40.5 | 40.5 |
| N1 = 1.7 | 0.464 to | 67.7 to | 60.7 to | 33.2 to | 35.0 to |
| N2 = 1.69 | 0.593 | 100.0 | 100.0 | 40.5 | 40.5 |

TABLE 9-continued

| Refractive index | Depth [μm] | 0-order diffraction efficiency of λ 3 [%] | |
|---|---|---|---|
| | | 770 nm | 790 nm |
| N3 = 1.385 | 0.821 to 1.038 | 37.4 to 40.5 | 36.7 to 40.5 |
| N3 = 1.485 | 0.653 to 0.830 | 37.5 to 40.5 | 36.7 to 40.5 |
| N3 = 1.585 | 0.542 to 0.692 | 37.5 to 40.5 | 36.8 to 40.5 |
| N3 = 1.685 | 0.464 to 0.593 | 37.6 to 40.5 | 36.8 to 40.5 |

As apparent from Table 9, when the depth d of the concave portion in the concave/convex diffraction pattern portion 21a1 of the aberration correction element 21 is set between dp and dq (phase difference 2π to a range slightly shorter than 2π with respect to the wavelength λ1) in the above-described wavelength range, the change is gentle in the vicinity of the maximum diffraction efficiency for all the extra-high density optical disc 1, DVD 2, and CD 3. Therefore, the aberration correction element 21 is capable of obtaining a high and good-balance diffraction efficiency for all the extra-high density optical disc 1, DVD 2, and the CD 3. That is, the phase difference between the light passing through the pattern of the convex portion and the light passing through the pattern of the concave portion is set to 2π or to be slightly shorter than 2π in the concave/convex diffraction pattern portion 21a1 of the aberration correction element 21.

Next, the application of an aberration correction element 21' of a modification in which the aperture limiting portion 21b3 for the second laser light formed in the outer circular region of the undersurface 21b of the aberration correction element 21 is removed to achieve partial simplification in the optical pickup device 10 according to the present invention will be described with reference to FIG. 4 described above, and new FIGS. 14A to 17.

Figure 14A:
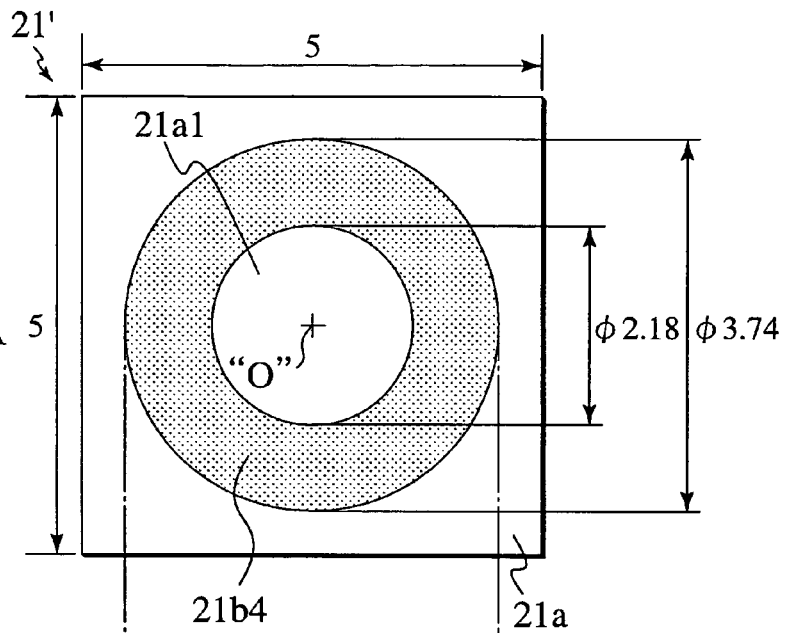
FIGS. 14A to 14C are explanatory views of a partially simplified aberration correction element as a modification, where
Figure 14B:
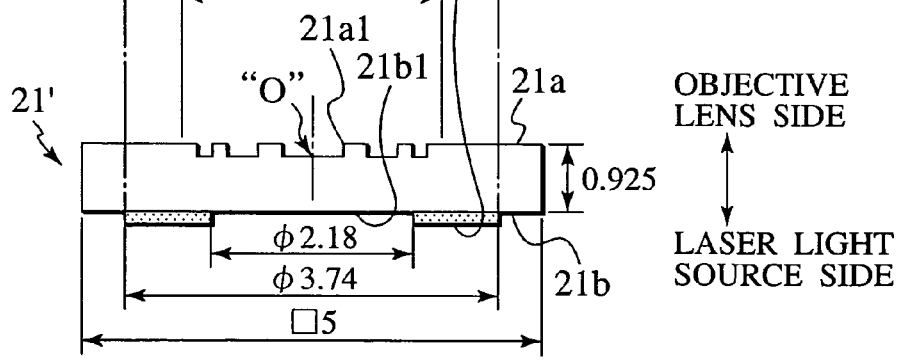
Figure 14C:
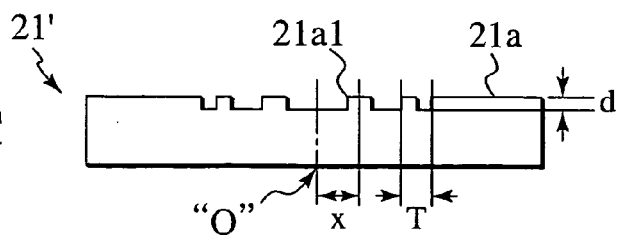

FIGS. 14A to 14C are explanatory views of the aberration correction element as a modification in which the partial simplification is achieved, where FIG. 14A is a top plan view, FIG. 14B is a front view, and FIG. 14C is a concave/convex shape diagram of the concave/convex diffraction pattern portion.

Figure 15:
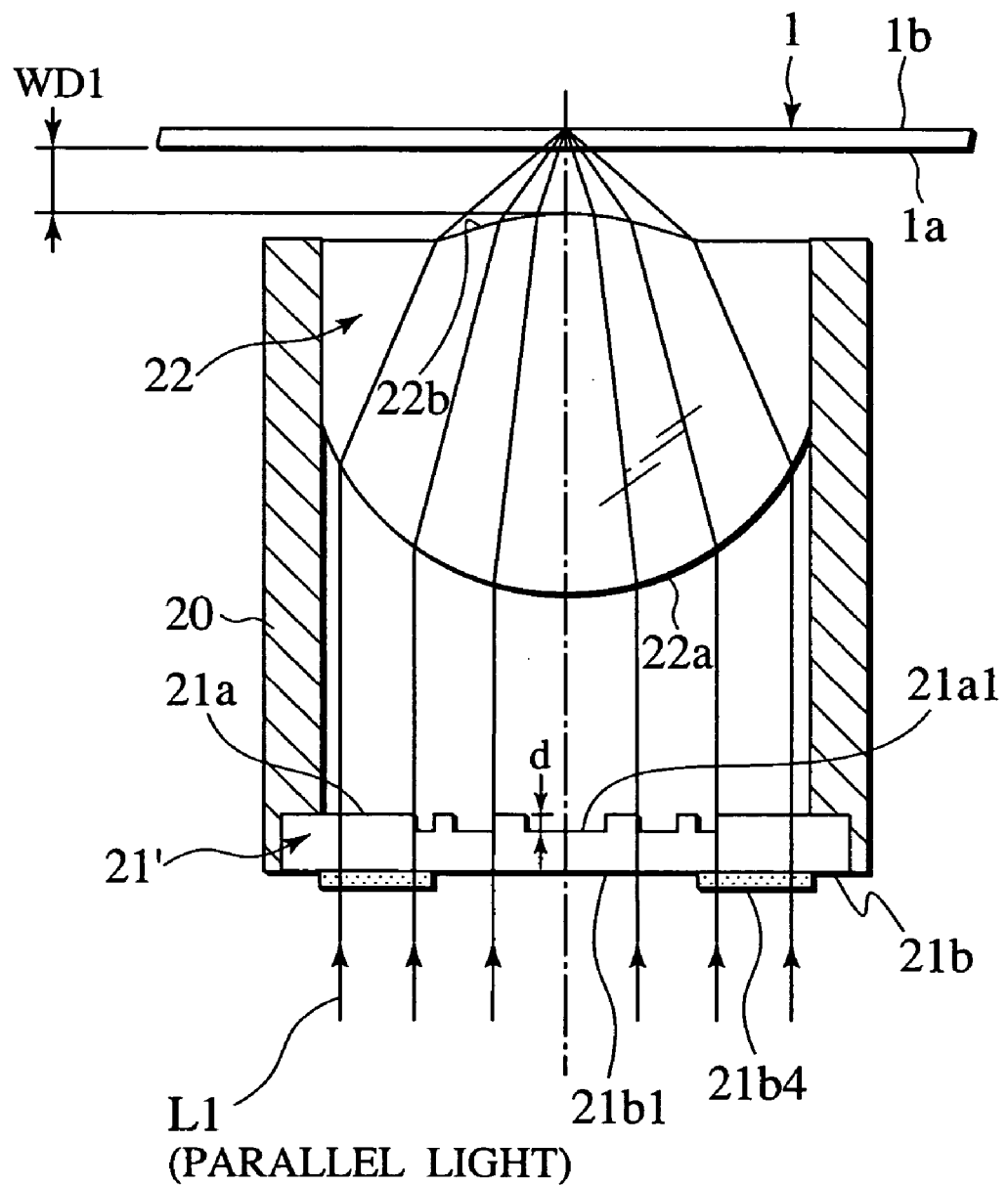
FIG. 15 is a diagram schematically showing a case where the extra-high density optical disc is recorded or reproduced with the aberration correction element of the modification shown in FIGS. 14A to 14C and the objective lens shown in FIG. 8.

FIG. 15 is a diagram schematically showing a case where the extra-high density optical disc is recorded or reproduced with the aberration correction element as the modification shown in FIGS. 14A to 14C and the objective lens shown in FIG. 8.

Figure 16:
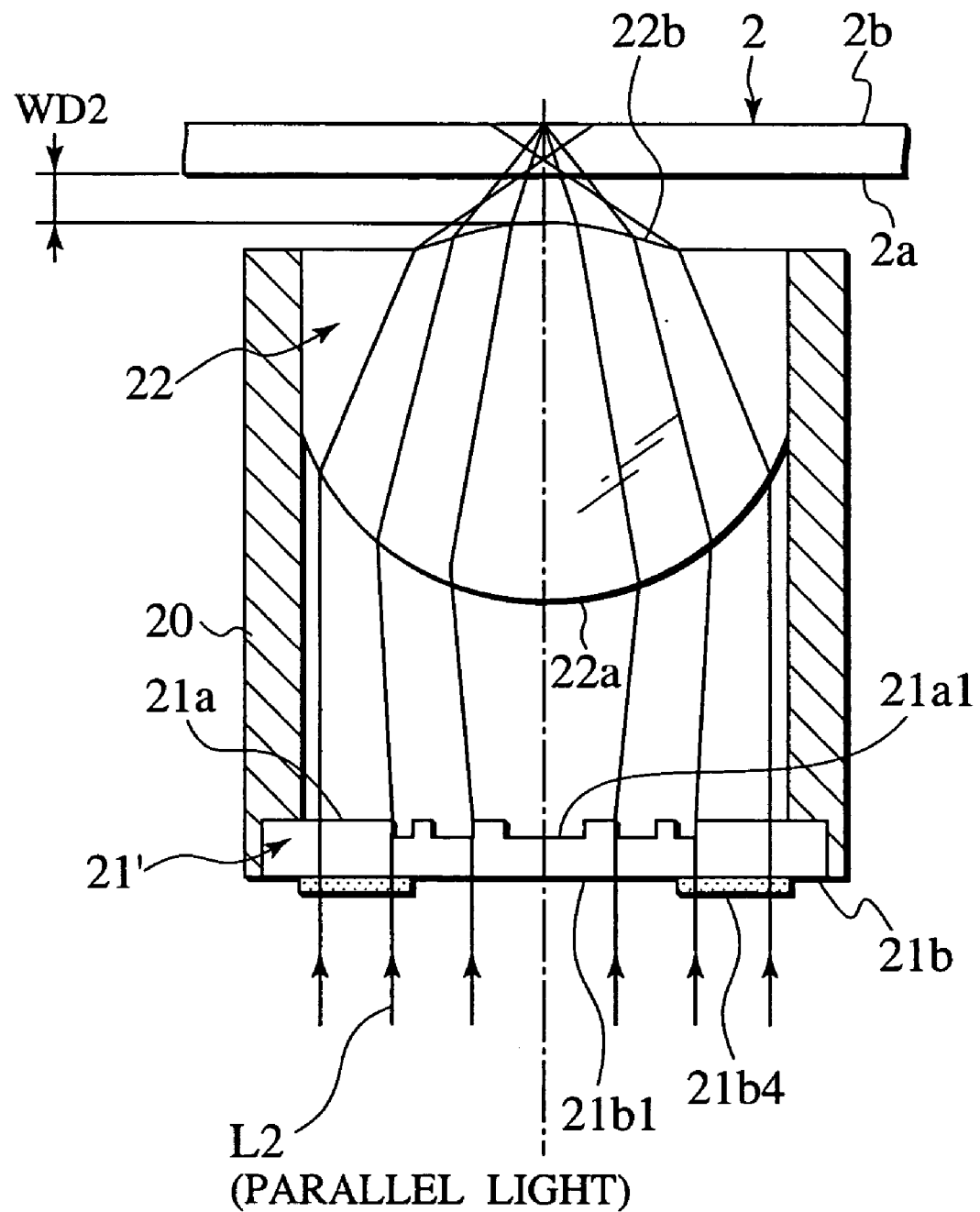
FIG. 16 is a ray diagram showing a case where the DVD is recorded or reproduced with the aberration correction element of the modification shown in FIGS. 14A to 14C and the objective lens shown in FIG. 8.
Figure 17:
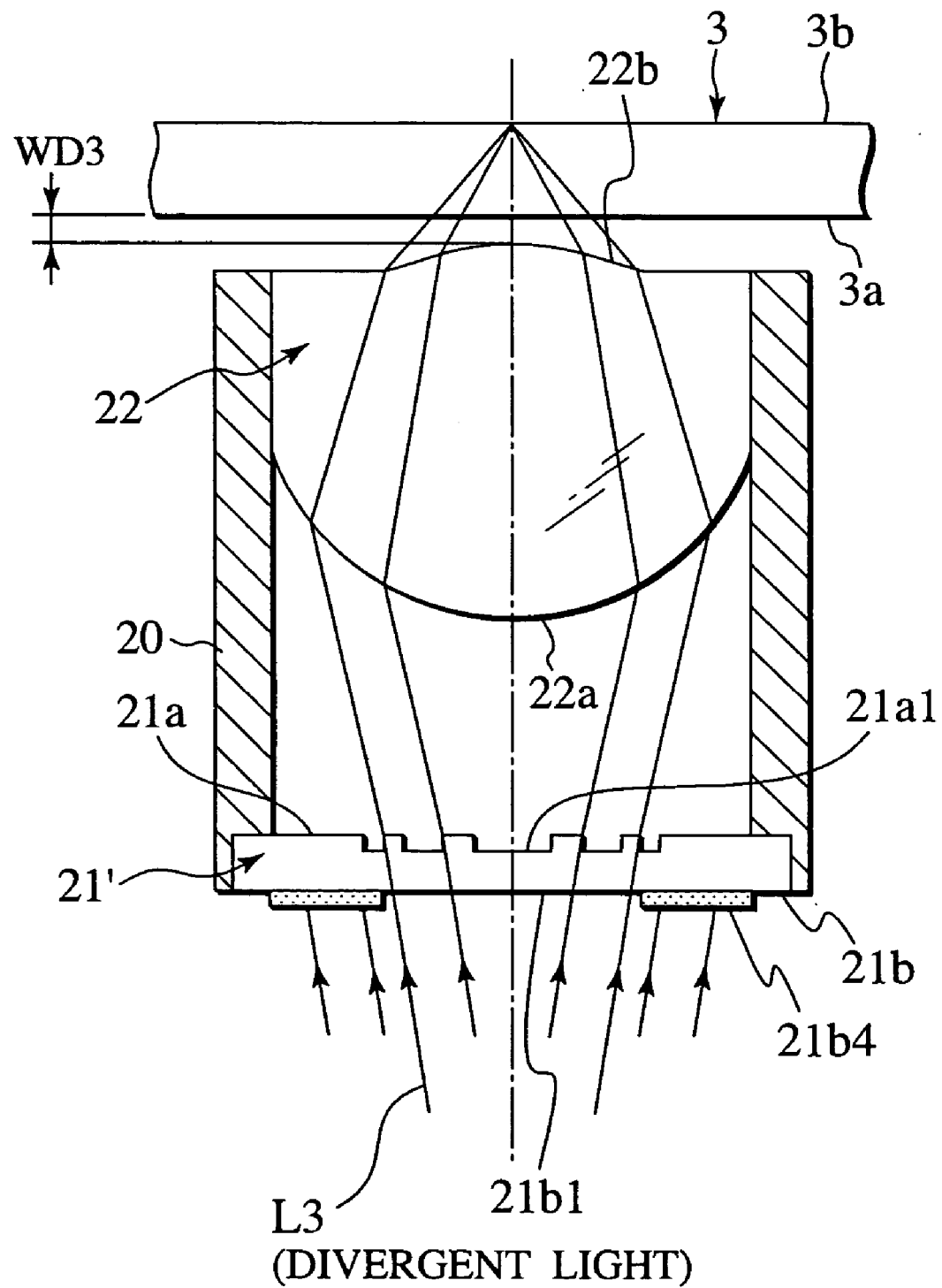
FIG. 17 is a ray diagram showing a case where the CD is recorded or reproduced with the aberration correction element of the modification shown in FIGS. 14A to 14C and the objective lens shown in FIG. 8.

FIG. 16 is a ray diagram showing a case where the DVD is recorded or reproduced with the aberration correction element as the modification shown in FIGS. 14A to 14C and the objective lens shown in FIG. 8. FIG. 17 is a ray diagram showing a case where the CD is recorded or reproduced by the aberration correction element as the modification shown in FIGS. 14A to 14C and the objective lens shown in FIG. 8.

In the optical pickup device 10 according to the present invention, an aberration correction element 21' replacing the above-described aberration correction element 21 in a modification in which the partial simplification is achieved is stored in the lower part of the lens holder 20 as shown in FIG. 4, and the objective lens 22 is stored in the upper part of the aberration correction element 21'.

That is, as shown in FIGS. 14A and 14B, in the aberration correction element 21' of the partially simplified modification, an outer configuration is formed in a 5 mm square using borosilicate crown glass (BK7) having a transmittance and having a thickness of 0.925 mm in the same manner as in the aberration correction element 21 described with reference to FIGS. 7A and 7B. Moreover, the concave/convex diffraction pattern portion 21a1 is formed in the inner circular region having a diameter of φ2.6 mm centering on the center "O" on the upper surface 21a side facing the objective lens 22 (FIG. 4). Furthermore, the outer circular region adjacent to the outer periphery of the concave/convex diffraction pattern portion 21a1 constitutes the flat upper surface 21a on which any concave/convex diffraction pattern portion is not formed.

Moreover, as shown in FIG. 14C, in the concave/convex diffraction pattern portions 21a1 formed in a concave/convex form on the upper surface 21a of the aberration correction element 21', a plurality of annular concave/convex pattern are formed in such a manner that the concave/convex repeating period T is gradually shortened or lengthened toward the outer circular portion from the inner circular portion. The depth d of the concave portion in the concave/convex diffraction pattern portion 21a1 having a step number of one is obtained from the above equation (1) so as to prevent the diffraction function from being produced with respect to the first laser light L1 having the wavelength λ1=405 nm emitted from the blue semiconductor laser 11 (FIG. 4). As a result, the 0-order light of the first laser light L1 is transmitted as such without being diffracted. That is, when the depth d of the concave portion in the concave/convex diffraction pattern portion 21a1 is integer times the phase difference 2π, the 0-order diffraction efficiency is 100%. When the natural number k in the equation (1) is 1, the depth d of the concave portion in the concave/convex diffraction pattern portion 21a1 formed in the upper surface 21a of the aberration correction element 21' is 0.763 μm.

On the other hand, a respect different from the above-described aberration correction element 21 will be described. As shown in FIGS. 14A and 14B, on the undersurface 21b side of the aberration correction element 21' of the partially modified modification, the light-transparent flat portion 21b1 behind the concave/convex diffraction pattern portion 21a1 is formed in the circular shape in the inner circular region of a diameter φ2.18 mm centering on the center "O". Moreover, an aperture limiting portion for the third laser light 21b4 which limits the numerical aperture into the objective lens 22 with respect to the third laser light L3 is formed in an annular shape using the dichroic film in an outer circular region having a diameter φ2.18 mm or more and diameter φ3.74 mm or less adjacent to the periphery of the light-transparent flat portion 21b1. That is, since the aperture limiting portion for the third laser light 21b4 is formed in a region including the aperture limiting portions for the second, third laser lights 21b2, 21b3 described above with reference to FIGS. 7A and 7B, and the aperture limiting portion for the second laser light 21b3 is not formed, the aberration correction element 21' of the modification can be prepared inexpensively.

Here, as shown in FIG. 15, when the extra-high density optical disc 1 is recorded or reproduced with the aberration correction element 21' and objective lens 22 stored in the lens holder 20, the first laser light L1 having the wavelength λ1=405 nm emitted from the blue semiconductor laser 11 (FIG. 4) is formed in the parallel light in the collimator lens 12 (FIG. 4) in a state in which the working distance WD1 between the second surface 22*b* of the objective lens 22 and the laser beam incidence surface 1*a* of the extra-high density optical disc 1 is set to about 0.5 mm. The parallel light is transmitted as such through the light-transparent flat portion 21*b*1 formed in the circular shape in the inner circular region of the undersurface 21*b* of the aberration correction element 21', and the aperture limiting portion for the third laser light 21*b*4 formed in the annular shape using the dichroic film outside the light-transparent flat portion 21*b*1. Furthermore, the 0-order light is not diffracted by the concave/convex diffraction pattern portion 21*a*1 formed in the inner circular region of the upper surface 21*a* of the aberration correction element 21 and is transmitted as such and remains to be the parallel light. The parallel light is incident upon the first surface 22*a* of the objective lens 22.

Moreover, the first laser beam focused by the first and second surfaces 22*a*, 22*b* of the objective lens 22 is incident upon the laser beam incidence surface 1*a* of the extra-high density optical disc 1, and is converged onto the signal surface 1*b* having a disc substrate thickness of 0.1 mm.

In this case, since any diffraction does not occur with respect to the first laser light L1 having the wavelength $\lambda 1=405$ nm in the concave/convex diffraction pattern portion 21*a*1 formed in the upper surface 21*a* of the aberration correction element 21', any loss is not generated in the quantity of light except the reflection or absorption in the aberration correction element 21'. When the depth d of the concave portion in the concave/convex diffraction pattern portion 21*a*1 is set to 0.763 μm as described above, the diffraction efficiency of the 0-order light is 100%.

Next, as shown in FIG. 16, when the DVD 2 is recorded or reproduced with the aberration correction element 21' and objective lens 22 stored in the lens holder 20 of the modification, the second laser light L2 having the wavelength $\lambda 2=660$ nm emitted from the red semiconductor laser 31 (FIG. 4) is formed in the parallel light in the collimator lens 34 (FIG. 4) in a state in which the working distance WD2 between the second surface 22*b* of the objective lens 22 and the laser beam incidence surface 2*a* of the DVD 2 is set to about 0.35 mm. This parallel light is transmitted as such through the light-transparent flat portion 21*b*1 formed in the circular shape in the inner circular region of the undersurface 21*b* of the aberration correction element 21', and the aperture limiting portion for the third laser light 21*b*4 formed in the annular shape using the dichroic film outside the light-transparent flat portion 21*b*1.

Here, parallel light through the outer circular region with 2.6 mm or more outside the concave/convex diffraction pattern portion 21*a*1 formed in the inner circular region of the upper surface 21*a* of the aberration correction element 21' in the parallel light incident upon the undersurface 21*b* side of the aberration correction element 21' is transmitted as such through the outer circular region of the flat upper surface 21*a* on which any concave/convex diffraction pattern portion is not formed, and is incident upon the objective lens 22. Therefore, an aberration in a peripheral portion on the aberration correction element 21' is large, the wave fronts of the inner and outer regions non-continuously change, the continuity of the wave front is not kept, and thus an outer peripheral light transmitted through the objective lens 22 does not contribute to the formation of the spot on the signal surface 2*b* of the DVD 2. In other words, as described above, the concave/convex diffraction pattern portion 21*a*1 formed in the inner circular region of the upper surface 21*a* of the aberration correction element 21' is formed in such a manner that the numerical aperture into the objective lens 22 corresponds to 0.6 with respect to the DVD 2. Therefore, since the parallel light of the outer circular region by the second laser light L2 does not pass through the concave/convex diffraction pattern portion 21*a*1, the light does not contribute to the formation of the spot in a state in which the numerical aperture into the objective lens 22 is limited with respect to the DVD 2.

On the other hand, for the parallel light incident upon the undersurface 21*b* of the aberration correction element 21', only the parallel light of the inner circular region with φ2.6 mm or less inside the concave/convex diffraction pattern portion 21*a*1 formed in the inner circular region of the upper surface 21*a* of the aberration correction element 21' is diffracted by the concave/convex diffraction pattern portion 21*a*1. The 1st order light as divergent light obtained by the diffraction is incident upon the first surface 22*a* of the objective lens 22 to correct a spherical aberration thereon.

Moreover, the second laser beam focused by the first and second surfaces 22*a*, 22*b* of the objective lens 22 is incident upon the laser beam incidence surface 2*a* of the DVD 2, and converged onto the signal surface 2*b* having a disc substrate thickness of 0.6 mm.

In this case, since the objective lens 22 is designed for the extra-high density optical disc, the spherical aberration is large with respect to the second laser light L2 having the wavelength $\lambda 2=660$ nm emitted from the red semiconductor laser 31 (FIG. 4). However, since the wave front is corrected with respect to the second laser light L2 in the concave/convex diffraction pattern portion 21*a*1 formed on the upper surface 21*a* of the aberration correction element 21' to correct the spherical aberration, any trouble is not caused in the recording or reproducing of the DVD 2.

Next, as shown in FIG. 17, when the CD 3 is recorded or reproduced with the aberration correction element 21' and objective lens 22 stored in the lens holder 20 of the modification, the third laser light L3 having the wavelength $\lambda 3=780$ nm emitted from the red semiconductor laser 41 (FIG. 4) is formed in the parallel light in the collimator lens 44 (FIG. 4) and further into the divergent light by the concave lens 45 (FIG. 4) in a state in which the working distance WD3 between the second surface 22*b* of the objective lens 22 and the laser beam incidence surface 3*a* of the CD 3 is set to about 0.14 mm. This divergent light is interrupted by the aperture limiting portion 21*b*4 for the third laser light formed in the annular shape using the dichroic film in the outer circular region of the undersurface 21*b* of the aberration correction element 21', and the aperture is limited in such a manner that the numerical aperture (NA) into the objective lens 22 corresponds to 0.45. Even in this case, after transmitted through the light-transparent flat portion 21*b*1 formed in the circular shape in the inner circular region of the undersurface 21*b* of the aberration correction element 21', the divergent light of the third laser light L3 is diffracted to be divergent light having a larger degree in diffusion than that of the second laser light L2 by the concave/convex diffraction pattern portion 21*a*1 formed in the inner circular region of the upper surface 21*a* of the aberration correction element 21'. The 1st order light as divergent light obtained by the diffraction is incident upon the first surface 22*a* of the objective lens 22 to correct a spherical aberration thereon.

Moreover, the third laser beam focused by the first and second surfaces 22*a*, 22*b* of the objective lens 22 is incident upon the laser beam incidence surface 3*a* of the CD 3, and converged onto the signal surface 3*b* having a disc substrate thickness of 1.2 mm.

In this case, since the objective lens 22 is designed for the extra-high density optical disc, the spherical aberration is large with respect to the third laser light L3 having the wavelength λ3=780 nm emitted from the infrared semiconductor laser 41 (FIG. 4). However, the period T (FIG. 14C) of the concave/convex diffraction pattern portion 21a1 formed in the upper surface 21a of the aberration correction element 21' is designed to be optimum with respect to the second laser beam. Therefore, the wave front is corrected with respect to the third laser-light L3 in the concave/convex diffraction pattern portion 21a1 to correct the spherical aberration. Furthermore, the finite correction is performed with respect to the insufficient spherical aberration correction amount when the third laser light L3 formed into the divergent light using the concave lens 45 (FIG. 4) is incident upon the aberration correction element 21'. Since the wave front correction is combined with the finite correction to correct the spherical aberration, any trouble is not caused in the recording or reproducing of the CD 3.

Moreover, even with the use of the aberration correction element 21' of the partially simplified modification, the first laser light L1 for the extra-high density optical disc and the second laser light L2 for the DVD are incident upon the undersurface 21b of the aberration correction element 21' in the form of the parallel lights. Only the third laser light L3 for the CD is incident upon the undersurface 21b of the aberration correction element 21' in the form of the divergent light. Therefore, in the same manner as in the above-described aberration correction element 21, even when the optical axes of the first and second laser lights L1, L2 slightly deviate from the optical axis of the objective lens 22, the deterioration of the spherical aberration is reduced, and it is easier to adjust the optical axis at the time of the assembling in the parallel light rather than in the divergent light when the light is incident upon the aberration correction element 21'. Furthermore, in the same manner as in the description with reference to FIG. 12 the wave front aberration at the objective lens shift time with respect to the DVD 2, CD 3 can be enhanced as compared with the conventional example.

Furthermore, even in the aberration correction element 21' of the partially simplified modification, the depth d of the concave portion in the concave/convex diffraction pattern portion 21a1 formed in the upper surface 21a is set to be between a depth capable of obtaining the approximately maximum diffraction efficiency with respect to the first laser light L1 having the wavelength λ1 of 405 nm and a depth capable of obtaining the approximately maximum diffraction efficiency with respect to the second laser light L2 having the wavelength λ2 of 660 nm in the same manner as described above with reference to FIG. 13. Accordingly, the approximately maximum diffraction efficiency is obtained even with respect to the third laser light L3 having the wavelength λ3 of 780 nm as described above. Therefore, the extra-high density optical disc 1, DVD 2, and CD 3 can be satisfactorily recorded or reproduced.

It should be understood that many modifications and adaptations of the invention will become apparent to those skilled in the art and it is intended to encompass such obvious modifications and changes in the scope of the claims appended hereto.

What is claimed is:

1. An optical pickup device which selectively records or reproduces data on or from a first optical recording medium, a second optical recording medium having a recording density lower than that of the first optical recording medium, a third optical recording medium having a recording density lower than that of the second optical recording medium, and a combined optical recording medium including appropriately combined and integrally stacked signal surfaces of the first to third optical recording mediums, the device comprising:

a first laser light source which emits a first laser light for the first optical recording medium;

a second laser light source which emits a second laser light having a wavelength longer than that of the first laser light for the second optical recording medium;

a third laser light source which emits a third laser light having a wavelength longer than that of the second laser light for the third optical recording medium;

an objective lens whose numerical aperture (NA) is set to 0.75 or more for the first optical recording medium and in which at least one of first and second surfaces turning to a reverse direction each other is formed in a non-spherical surface and which converges the first to third laser lights on the respective signal surfaces of the first to third optical recording mediums; and an aberration correction element in which a circular light-transparent flat portion and annular aperture limiting portions for the third and second laser lights are formed toward an outer circular portion from a central portion in order on an undersurface on the side of the first to third laser light sources and in which a diffraction pattern portion is formed in an inner circular region of an upper surface on the side of the objective lens and in which an outer side of the diffraction pattern portion is formed to be flat, wherein the aberration correction element transmits the first laser light, which is incident thereon in a parallel light state, as such through the light-transparent flat portion and the aperture limiting portions for the second and third laser lights, transmits the first laser light without diffracting the first laser light through the diffraction pattern portion, and allows a 0-order light thereof to be incident upon the objective lens, the aberration correction element interrupts the second laser light, which is incident thereon in the parallel light state, by the aperture limiting portion for the second laser light to limit the numerical aperture into the objective lens to a first predetermined numerical aperture, transmits the second laser light through the light-transparent flat portion and the aperture limiting portion for the third laser light, and thereafter diffracts the second laser light by the diffraction pattern portion so that a 1st order light of the second laser light capable of correcting a spherical aberration with respect to the second laser light that will occur on the objective lens is incident upon the objective lens, and further the aberration correction element interrupts the third laser light, which is incident thereon in a divergent light state, by the aperture limiting portions for the second and third laser lights to limit the numerical aperture into the objective lens to a second predetermined numerical aperture, transmits the third laser light through the light-transparent flat portion, thereafter diffracts the third laser light by the diffraction pattern portion to allow the third laser light to have a larger degree in diffusion that that of the second laser light so that a 1st order light of the third laser light capable of correcting a spherical aberration with respect to the third laser light that will occur on the objective lens is incident upon the objective lens.

2. The optical pickup device according to claim 1, wherein the diffraction pattern portion is formed in a concave/convex state and in an annular form in such a manner that a repetition period of concave/convex portions is gradually shortened or lengthened toward an outer circular portion from an inner circular portion, and a depth of the concave portion in the diffraction pattern portion is set to be between a depth capable of obtaining an approximately maximum diffraction efficiency with respect to the first laser light and a depth capable of obtaining an approximately maximum diffraction efficiency with respect to the second laser light.

3. An optical pickup device which selectively records or reproduces data on or from a first optical recording medium, a second optical recording medium having a recording density lower than that of the first optical recording medium, a third optical recording medium having a recording density lower than that of the second optical recording medium, and a combined optical recording medium including appropriately combined and integrally stacked signal surfaces of the first to third optical recording mediums, the device comprising:
- a first laser light source which emits a first laser light for the first optical recording medium;
- a second laser light source which emits a second laser light having a wavelength longer than that of the first laser light for the second optical recording medium;
- a third laser light source which emits a third laser light having a wavelength longer than that of the second laser light for the third optical recording medium;
- an objective lens whose numerical aperture (NA) is set to 0.75 or more for the first optical recording medium and in which at least one of first and second surfaces turning to a reverse direction each other is formed in a non-spherical surface and which converges the first to third laser lights on the respective signal surfaces of the first to third optical recording mediums; and
- an aberration correction element in which a circular light-transparent flat portion and an annular aperture limiting portion for the third laser light are formed in order toward an outer circular portion from a central portion on an undersurface on the side of the first to third laser light sources and in which a diffraction pattern portion is formed in an inner circular region of an upper surface on the side of the objective lens and in which an outer side of the diffraction pattern portion is formed to be flat, wherein the aberration correction element transmits the first laser light, which is incident thereon in a parallel light state, as such through the light-transparent flat portion and the aperture limiting portion for the third laser light, transmits the first laser light without diffracting the first laser light through the diffraction pattern portion, and allows a 0-order light thereof to be incident upon the objective lens, the aberration correction element transmits the second laser light, which is incident in the parallel light state, as such through the light-transparent flat portion and the aperture limiting portion for the third laser light, and subsequently diffracts the second laser light by the diffraction pattern portion so that a 1st order light of the second laser light capable of correcting a spherical aberration that will occur on the objective lens is incident upon the objective lens, and the aberration correction element interrupts the third laser light, which is incident in a divergent light state, by the aperture limiting portion for the third laser light to limit the numerical aperture into the objective lens to a predetermined numerical aperture, transmits the third laser light through the light-transparent flat portion, subsequently diffracts the third laser light to have a larger degree in diffusion than that of the second laser light by the diffraction pattern portion so that a 1st order light of the third laser light capable of correcting a spherical aberration with respect to the third laser light is incident upon the objective lens.

4. The optical pickup device according to claim 3, wherein the diffraction pattern portion is formed in a concave/convex state and in an annular form in such a manner that a repetition period of concave/convex portions is gradually shortened or lengthened toward an outer circular portion from an inner circular portion, and a depth of the concave portion in the diffraction pattern portion is set to be between a depth capable of obtaining an approximately maximum diffraction efficiency with respect to the first laser light and a depth capable of obtaining an approximately maximum diffraction efficiency with respect to the second laser light.

* * * * *